(12) United States Patent
Matsushita

(10) Patent No.: US 9,779,338 B2
(45) Date of Patent: Oct. 3, 2017

(54) PRINT CONTROL DEVICE, PRINT SYSTEM, PRINT CONTROL METHOD AND NON-TRANSITORY COMPUTER-READABLE RECORDING MEDIUM

(71) Applicant: Konica Minolta, Inc., Tokyo (JP)

(72) Inventor: Kouichirou Matsushita, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/266,122

(22) Filed: Sep. 15, 2016

(65) Prior Publication Data

US 2017/0103288 A1    Apr. 13, 2017

(30) Foreign Application Priority Data

Oct. 13, 2015    (JP) .................................. 2015-202285

(51) Int. Cl.
*G06K 15/02*    (2006.01)
*H04N 1/00*    (2006.01)
*G06K 15/00*    (2006.01)
*G06F 3/12*    (2006.01)

(52) U.S. Cl.
CPC ....... *G06K 15/1836* (2013.01); *G06F 3/1252* (2013.01); *G06K 15/1807* (2013.01); *G06K 15/404* (2013.01); *H04N 1/0032* (2013.01); *H04N 1/00639* (2013.01); *H04N 2201/0094* (2013.01)

(58) Field of Classification Search
CPC .......................... G06K 15/1836; G06F 3/1252
See application file for complete search history.

(56) References Cited

U.S. PATENT DOCUMENTS

2013/0194598 A1*  8/2013  Torii .................. G06K 15/1813
                                                    358/1.13
2013/0256968 A1* 10/2013  Furukawa ................ H04N 1/00
                                                    270/14

FOREIGN PATENT DOCUMENTS

JP    2013-161096 A    8/2013
JP    2013-212636 A    10/2013

* cited by examiner

*Primary Examiner* — Ibrahim Siddo
(74) *Attorney, Agent, or Firm* — Osha Liang LLP

(57) ABSTRACT

A print control device includes a receiver that receives a print job and a processor that generates image data by rasterizing data of each page of the print job in parallel with a reception of the print job and controls a page order for rasterizing the data of each page. The processor rasterizes the data of each page in an order from a front page until a finish of a reception of data of a predetermined page determined according to a binding format of an output document to be prepared by the print job. After the reception of the data of the predetermined page is finished, the processor controls the page order to optimally rasterize the data of each page according to the binding format.

16 Claims, 25 Drawing Sheets

FIG.2A

BINDING FORMAT: SADDLE STITCHING

| JOB CONFIGURATION | 1 | 2 | 3 | 4 | 5 | 6 | 7 | 8 |
|---|---|---|---|---|---|---|---|---|
| PAGE NUMBER | 1 | 2 | 3 | 4 | 5 | 6 | 7 | 8 |
| CONVENTIONAL RIP ORDER | 1 | 2 | 3 | 4 | 5 | 6 | 7 | 8 |

FIG.2B

| JOB CONFIGURATION | 1 | 2 | 3 | 4 | 5 | 6 | 7 | 8 |
|---|---|---|---|---|---|---|---|---|
| PAGE NUMBER | 1 | 2 | 3 | 4 | 5 | 6 | 7 | 8 |
| OPTIMAL RIP ORDER | 1 | 3 | 5 | 7 | 8 | 6 | 4 | 2 |
| DYNAMIC RIP ORDER | 1 | 2 | 5 | 7 | 8 | 6 | 4 | 3 |

FIG.2C

| JOB CONFIGURATION | 1 | 2 | 3 | 4 | 5 | 6 | 7 | 8 |
|---|---|---|---|---|---|---|---|---|
| PAGE NUMBER | 1 | 2 | 3 | 4 | 5 | 6 | 7 | 8 |
| OPTIMAL RIP ORDER | 1 | 3 | 5 | 7 | 8 | 6 | 4 | 2 |
| DYNAMIC RIP ORDER | 1 | 2 | 3 | 7 | 8 | 6 | 5 | 4 |

FIG. 3 A

BINDING FORMAT: SADDLE STITCHING INSERTING BLANK PAGES

| JOB CONFIGURATION | 1 | | 2 | 3 | 4 | 5 | 6 | |
|---|---|---|---|---|---|---|---|---|
| PAGE NUMBER | 1 | 2 | 3 | 4 | 5 | 6 | 7 | 8 |
| CONVENTIONAL RIP ORDER | 1 | — | 2 | 3 | 4 | 5 | 6 | — |

FIG. 3 B

| JOB CONFIGURATION | 1 | | 2 | 3 | 4 | 5 | 6 | |
|---|---|---|---|---|---|---|---|---|
| PAGE NUMBER | 1 | 2 | 3 | 4 | 5 | 6 | 7 | 8 |
| OPTIMAL RIP ORDER | 1 | 3 | 5 | 7 | 8 | 6 | 4 | 2 |
| DYNAMIC RIP ORDER | 1 | — | 2 | 5 | 6 | 4 | 3 | — |

FIG. 3 C

| JOB CONFIGURATION | 1 | | 2 | 3 | 4 | 5 | 6 | |
|---|---|---|---|---|---|---|---|---|
| PAGE NUMBER | 1 | 2 | 3 | 4 | 5 | 6 | 7 | 8 |
| OPTIMAL RIP ORDER | 1 | 3 | 5 | 7 | 8 | 6 | 4 | 2 |
| DYNAMIC RIP ORDER | 1 | — | 2 | 3 | 6 | 5 | 4 | — |

FIG.4A

BINDING FORMAT: SIDE STITCHING

| JOB CONFIGURATION | 1 | 2 | 3 | 4 | 5 | 6 | 7 | 8 |
|---|---|---|---|---|---|---|---|---|
| PAGE NUMBER | 1 | 2 | 3 | 4 | 5 | 6 | 7 | 8 |
| CONVENTIONAL RIP ORDER | 1 | 2 | 3 | 4 | 5 | 6 | 7 | 8 |

FIG.4B

| JOB CONFIGURATION | 1 | 2 | 3 | 4 | 5 | 6 | 7 | 8 |
|---|---|---|---|---|---|---|---|---|
| PAGE NUMBER | 1 | 2 | 3 | 4 | 5 | 6 | 7 | 8 |
| OPTIMAL RIP ORDER | 7 | 8 | 1 | 2 | 3 | 4 | 5 | 6 |
| DYNAMIC RIP ORDER | 1 | 8 | 2 | 3 | 4 | 5 | 6 | 7 |

FIG.4C

| JOB CONFIGURATION | 1 | 2 | 3 | 4 | 5 | 6 | 7 | 8 |
|---|---|---|---|---|---|---|---|---|
| PAGE NUMBER | 1 | 2 | 3 | 4 | 5 | 6 | 7 | 8 |
| OPTIMAL RIP ORDER | 7 | 8 | 1 | 2 | 3 | 4 | 5 | 6 |
| DYNAMIC RIP ORDER | 1 | 2 | 3 | 4 | 5 | 6 | 7 | 8 |

FIG.5A

BINDING FORMAT: SIDE STITCHING INSERTING BLANK PAGES

| JOB CONFIGURATION | 1 | | 2 | 3 | 4 | 5 | | 6 |
|---|---|---|---|---|---|---|---|---|
| PAGE NUMBER | 1 | 2 | 3 | 4 | 5 | 6 | 7 | 8 |
| CONVENTIONAL RIP ORDER | 1 | - | 2 | 3 | 5 | 5 | - | 6 |

FIG.5B

| JOB CONFIGURATION | 1 | | 2 | 3 | 4 | 5 | | 6 |
|---|---|---|---|---|---|---|---|---|
| PAGE NUMBER | 1 | 2 | 3 | 4 | 5 | 6 | 7 | 8 |
| OPTIMAL RIP ORDER | 7 | 8 | 1 | 2 | 3 | 4 | 5 | 6 |
| DYNAMIC RIP ORDER | 1 | - | 2 | 3 | 4 | 5 | - | 6 |

FIG.5C

| JOB CONFIGURATION | 1 | | 2 | 3 | 4 | 5 | | 6 |
|---|---|---|---|---|---|---|---|---|
| PAGE NUMBER | 1 | 2 | 3 | 4 | 5 | 6 | 7 | 8 |
| OPTIMAL RIP ORDER | 6 | - | 1 | 2 | 3 | 4 | - | 5 |
| DYNAMIC RIP ORDER | 1 / 7 | - | 2 | 3 | 4 | 5 | - | 6 |

FIG.6A

BINDING FORMAT: SIDE STITCHING

| JOB CONFIGURATION | 1 | 2 | 3 | 4 | 5 | 6 | 7 | 8 |
|---|---|---|---|---|---|---|---|---|
| PAGE NUMBER | 1 | 2 | 3 | 4 | 5 | 6 | 7 | 8 |
| CONVENTIONAL RIP ORDER | 1 | 2 | 3 | 4 | 5 | 6 | 7 | 8 |

FIG.6B

| JOB CONFIGURATION | 1 | 2 | 3 | 4 | 5 | 6 | 7 | 8 |
|---|---|---|---|---|---|---|---|---|
| PAGE NUMBER | 1 | 2 | 3 | 4 | 5 | 6 | 7 | 8 |
| OPTIMAL RIP ORDER | 7 | 8 | 1 | 2 | 3 | 4 | 5 | 6 |
| DYNAMIC RIP ORDER | 1 | 8 | 2 | 3 | 4 | 5 | 6 | 7 |

FIG.6C

| JOB CONFIGURATION | 1 | 2 | 3 | 4 | 5 | 6 | 7 | 8 |
|---|---|---|---|---|---|---|---|---|
| PAGE NUMBER | 1 | 2 | 3 | 4 | 5 | 6 | 7 | 8 |
| OPTIMAL RIP ORDER | 7 | 8 | 1 | 2 | 3 | 4 | 5 | 6 |
| DYNAMIC RIP ORDER | 1 | 2 | 3 | 4 | 5 | 6 | 7 | 8 |

FIG.7A

BINDING FORMAT: SIDE STITCHING INSERTING BLANK PAGES

| JOB CONFIGURATION | 1 | | 2 | 3 | 4 | 5 | | 6 |
|---|---|---|---|---|---|---|---|---|
| PAGE NUMBER | 1 | 2 | 3 | 4 | 5 | 6 | 7 | 8 |
| CONVENTIONAL RIP ORDER | 1 | - | 2 | 3 | 5 | 5 | - | 6 |

FIG.7B

| JOB CONFIGURATION | 1 | | 2 | 3 | 4 | 5 | | 6 |
|---|---|---|---|---|---|---|---|---|
| PAGE NUMBER | 1 | 2 | 3 | 4 | 5 | 6 | 7 | 8 |
| OPTIMAL RIP ORDER | 7 | 8 | 1 | 2 | 3 | 4 | 5 | 6 |
| DYNAMIC RIP ORDER | 1 | - | 2 | 3 | 4 | 5 | - | 6 |

FIG.7C

| JOB CONFIGURATION | 1 | | 2 | 3 | 4 | 5 | | 6 |
|---|---|---|---|---|---|---|---|---|
| PAGE NUMBER | 1 | 2 | 3 | 4 | 5 | 6 | 7 | 8 |
| OPTIMAL RIP ORDER | 6 | - | 1 | 2 | 3 | 4 | - | 5 |
| DYNAMIC RIP ORDER | 1 / 7 | - | 2 | 3 | 4 | 5 | - | 6 |

FIG.8A

BINDING FORMAT: RING BINDING

| JOB CONFIGURATION | 1 | 2 | 3 | 4 | 5 | 6 | 7 | 8 |
|---|---|---|---|---|---|---|---|---|
| PAGE NUMBER | 1 | 2 | 3 | 4 | 5 | 6 | 7 | 8 |
| CONVENTIONAL RIP ORDER | 1 | 2 | 3 | 4 | 5 | 6 | 7 | 8 |

FIG.8B

| JOB CONFIGURATION | 1 | 2 | 3 | 4 | 5 | 6 | 7 | 8 |
|---|---|---|---|---|---|---|---|---|
| PAGE NUMBER | 1 | 2 | 3 | 4 | 5 | 6 | 7 | 8 |
| OPTIMAL RIP ORDER | 3 | 4 | 5 | 6 | 7 | 8 | 1 | 2 |
| DYNAMIC RIP ORDER | 1 | 2 | 3 | 6 | 7 | 8 | 4 | 5 |

FIG.8C

| JOB CONFIGURATION | 1 | 2 | 3 | 4 | 5 | 6 | 7 | 8 |
|---|---|---|---|---|---|---|---|---|
| PAGE NUMBER | 1 | 2 | 3 | 4 | 5 | 6 | 7 | 8 |
| OPTIMAL RIP ORDER | 3 | 4 | 5 | 6 | 7 | 8 | 1 | 2 |
| DYNAMIC RIP ORDER | 1 | 4 | 5 | 6 | 7 | 8 | 2 | 3 |

FIG.9A

BINDING FORMAT: RING BINDING INSERTING BLANK PAGES

| JOB CONFIGURATION | 1 | | 2 | 3 | 4 | 5 | | 6 |
|---|---|---|---|---|---|---|---|---|
| PAGE NUMBER | 1 | 2 | 3 | 4 | 5 | 6 | 7 | 8 |
| CONVENTIONAL RIP ORDER | 1 | - | 2 | 3 | 4 | 5 | - | 6 |

FIG.9B

| JOB CONFIGURATION | 1 | | 2 | 3 | 4 | 5 | | 6 |
|---|---|---|---|---|---|---|---|---|
| PAGE NUMBER | 1 | 2 | 3 | 4 | 5 | 6 | 7 | 8 |
| OPTIMAL RIP ORDER | 3 | 4 | 5 | 6 | 7 | 8 | 1 | 2 |
| DYNAMIC RIP ORDER | 1 | - | 2 | 4 | 5 | 6 | - | 3 |

FIG.9C

| JOB CONFIGURATION | 1 | | 2 | 3 | 4 | 5 | | 6 |
|---|---|---|---|---|---|---|---|---|
| PAGE NUMBER | 1 | 2 | 3 | 4 | 5 | 6 | 7 | 8 |
| OPTIMAL RIP ORDER | 3 | 4 | 5 | 6 | 7 | 8 | 1 | 2 |
| DYNAMIC RIP ORDER | 1 | - | 3 | 4 | 5 | 6 | - | 2 |

FIG.9D

| JOB CONFIGURATION | 1 | | 2 | 3 | 4 | 5 | | 6 |
|---|---|---|---|---|---|---|---|---|
| PAGE NUMBER | 1 | 2 | 3 | 4 | 5 | 6 | 7 | 8 |
| OPTIMAL RIP ORDER | 3 | 4 | 5 | 6 | 7 | 8 | 1 | 2 |
| DYNAMIC RIP ORDER | 1 / 3 | - | 4 | 5 | 6 | 7 | - | 2 |

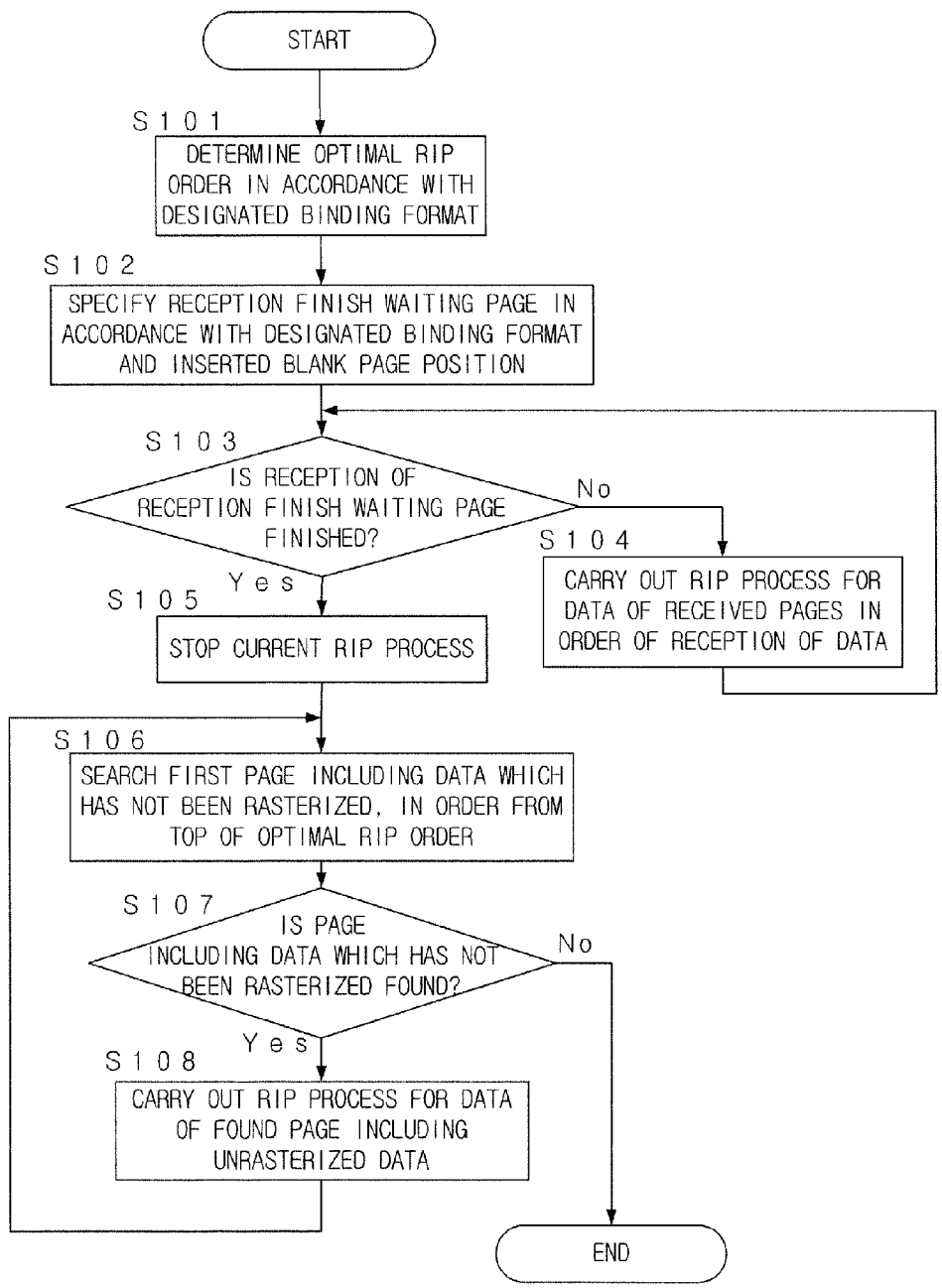

FIG.19
PRIOR ART
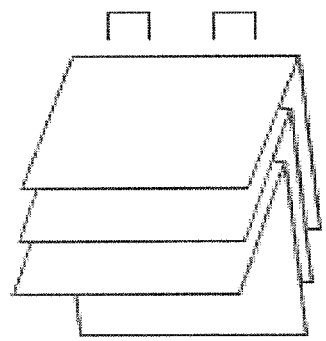
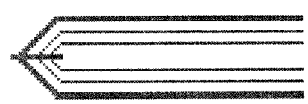
SADDLE
STITCHING
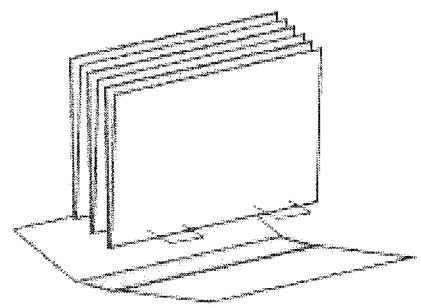
SIDE
STITCHING
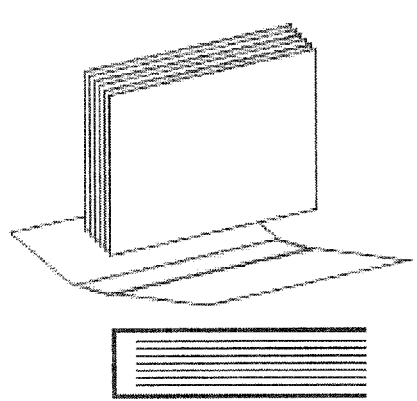
PERFECT
BINDING
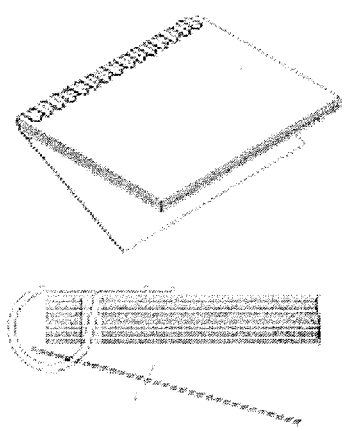
RING BINDING

FIG.21
PRIOR ART

| SHEET | SADDLE STITCHING | | SIDE STITCHING, PERFECT BINDING | | RING BINDING | |
|---|---|---|---|---|---|---|
| | FRONT SURFACE | REAR SURFACE | FRONT SURFACE | REAR SURFACE | FRONT SURFACE | REAR SURFACE |
| FIRST SHEET | N \| 1 | 2 \| N-1 | 6 \| 3 | 4 \| 5 | N-1 | N |
| SECOND SHEET | N-2 \| 3 | 4 \| N-3 | 10 \| 7 | 8 \| 9 | 1 | 2 |
| ⋮ | | | | | | |
| (FINAL-1)TH SHEET | N/2+3 \| N/2-3 | N/2-2 \| N/2+3 | N-2 \| N-5 | N-4 \| N-3 | N-5 | N-4 |
| FINAL SHEET | N/2+2 \| N/2-1 | N/2 \| N/2+1 | N \| 1 | 2 \| N-1 | N-3 | N-2 |

FIG.22A
PRIOR ART
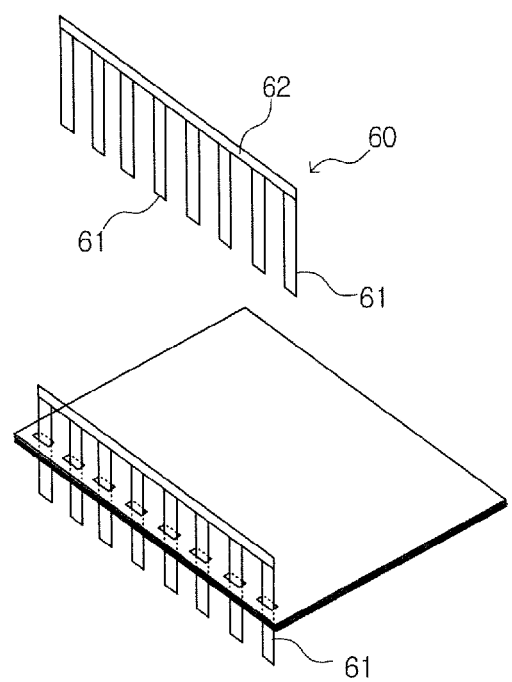
FIG.22B
PRIOR ART
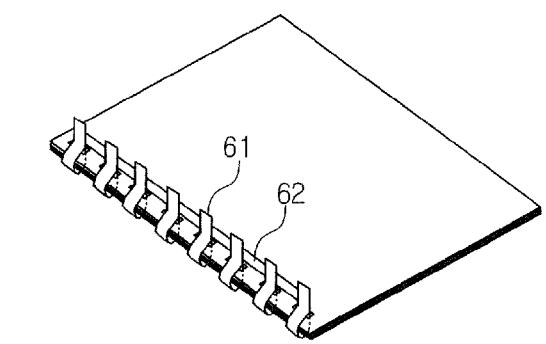
FIG.22C
PRIOR ART
FIG.22D
PRIOR ART
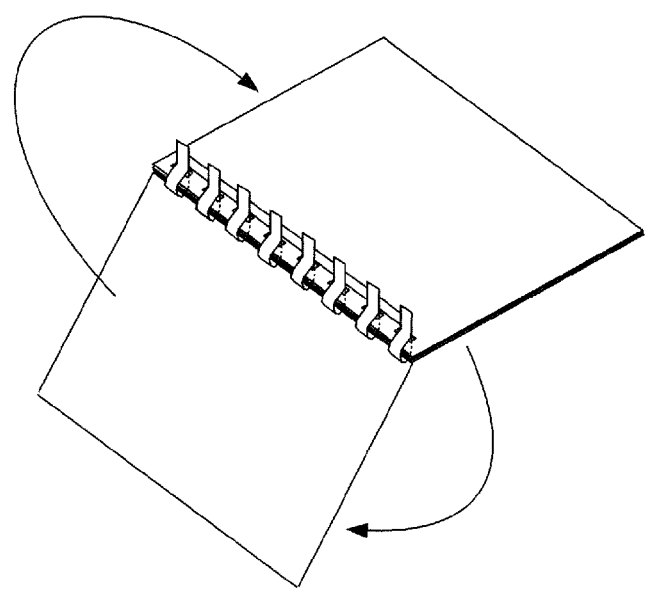

PRINT CONTROL DEVICE, PRINT SYSTEM, PRINT CONTROL METHOD AND NON-TRANSITORY COMPUTER-READABLE RECORDING MEDIUM

BACKGROUND OF THE INVENTION

Field of the Invention

The present invention relates to a print control device, a print system, a print control method and a non-transitory computer-readable recording medium for rasterizing the data of each page of a print job.

Description of Related Art

A recent image forming apparatus (print apparatus) forms an image and further has various types of post-processing functions. In particular, in the production print field, as shown in FIG. 19, the bookbinding output for carrying out various types of bookbinding processes, such as a saddle stitching, a side stitching (case binding), a perfect binding (case binding), a ring binding and the like, can be executed.

In the bookbinding output, images are printed on recording sheets in the order which is suitable for each binding format, and the corresponding bookbinding process is carried out for the printed sheets. Therefore, there are some cases in which a final page of a print job is printed on the first recording sheet to be used in the printing depending on the binding format.

As shown in FIG. 20, it is assumed that in the original document, the first to the Nth pages are arranged in order. The saddle stitching is a binding format in which after the 2-fold sheets are overlapped in the state in which each sheet is open, the sheets are stapled at the fold portion. Therefore, in case that the original document shown in FIG. 20 is printed in the saddle stitching, as shown in FIG. 21, it is necessary to print four pages which are the first page, the Nth page, the second page and the (N−1)th page on the both sides of the first recording sheet.

The side stitching is a binding format in which after the 2-fold sheets are overlapped in the state in which each sheet is folded and are bound near the fold by using a thread or a wire, the bound sheets are cased with one sheet which functions as the front cover and the back cover. The perfect binding is a binding format in which after the 2-fold sheets are overlapped in the state in which each sheet is folded and are bound by a bonding agent without using a thread or a wire, the bound sheets are cased with one sheet which functions as the front cover and the back cover. Therefore, in each of the above binding formats, as shown in FIG. 21, it is necessary to print four pages which are the sixth page, the third page, the fourth page and the fifth page on the both sides of the first recording sheet.

The ring binding is a binding format in which the sheets are overlapped and punched so as to form many holes along one end portion of the sheets, and the rings are fitted to the holes. In case that the ring binding is carried out by using a post-processing device of an image forming apparatus, as shown in FIGS. 22A to 22D, generally, after each tooth 61 of the comb-shaped resin piece 60 shown in FIG. 22A is inserted into the hole formed on the end portion of the sheets (See FIG. 22B), each tooth 61 is rounded in a ring form and the edge of the tooth 61 is bound to the base part 62 of the comb-shaped resin piece 60 by the heat fusion bonding (See FIG. 22C). Then, in order to improve the appearance by hiding the base part 62, the first recording sheet is used as the final page (back cover) by rotating along the rings by 360 degrees as shown in FIG. 22D. Therefore, in case the binding format is the ring binding, as shown in FIG. 21, the (N−1)th page and the Nth page are printed on the both sides of the first recording sheet.

Conventionally, in the binding, as shown in FIG. 23, before a job is generated, a user performs the pagination in which pages of the original document, which are arranged in the order from the front page to the final page, are rearranged according to the binding format (in FIG. 23, the case of the saddle stitching is shown). Then, a job data in which the pages are rearranged in order according to the layout of the above pagination is generated and is transmitted to an image forming apparatus. Further, in case that the layout of the pagination is changed after the job is generated, it is necessary to generate a job data again by performing the pagination according to the changed layout.

In recent years, as shown in FIG. 24, a job data in which the pages are arranged in the page order which is the same as that of the original document is transmitted to an image forming apparatus. Then, the image forming apparatus performs the pagination according to the designated binding format (in FIG. 24, the case of the saddle stitching is shown). Thereby, a user can obtain the booklet having the intended binding format by only designating the binding format without performing the pagination before a job is transmitted. Further, even if the contents of the pagination are changed after the job data is generated, it is possible to easily obtain the booklet having the intended binding format by only changing the designation of the binding format for the image forming apparatus.

In the bookbinding output, when the sheet which is used as the front cover and on which the image has been printed is previously prepared and is set to the predetermined tray, an image forming apparatus generally performs the process for binding the sheets on which the images are formed in accordance with the job with the above front cover, the process for inserting the blank page so as to match with the necessary pages in the binding format (for example, in case of the saddle stitching, the total number of the pages is necessarily a factor of 4.).

However, in a recent print processing, the contents of each page are described in the page description language (PDL), and an image forming apparatus receives the job in which each page is described in the PDL. Then, the image forming apparatus prints an image in accordance with the image data obtained by rasterizing the data of the received job (RIP: Raster Image Processor). In general, in the order of the reception of the data, that is, in the order from the front page, the data of each page is rasterized. However, for example, in Japanese Patent Application Publication No. 2013-161096, it is disclosed that the job is divided into pages, and the data is rasterized from an optional page.

As compared with the reception of the job data, it takes long time to carryout the rasterizing process. Therefore, when the image forming apparatus rasterizes the data of each page, in case that the rasterizing process is carried out in parallel with the reception of the data, it is possible to shorten the necessary time which elapses since the start of the reception of the data till the finish of the rasterizing process, as compared with the case in which after the data of the all of the pages are received, the rasterizing process is started.

However, in case that the job data is received in the page order of the original image and the image forming apparatus performs the pagination to execute the bookbinding output, when the data of each page is rasterized in the order of the reception of the data (in the order from the front page), there are some cases in which the final page or the like is printed on the first recording sheet to be used in the printing depending on the binding format. Therefore, in this case, the printing is started after the data of the final page or the like is rasterized. Even if the rasterizing process is carried out in parallel with the reception of the data, the start of the printing cannot be accelerated. As a result, the standby time caused until the finish of the printing becomes longer.

On the other hand, it is considered that the data is rasterized not in the order of the reception of the data, but in the page order corresponding to the binding format by using the technology disclosed in Japanese Patent Application Publication No. 2013-161096, in which the data is rasterized in the intended page order. However, in this method, for example, in case of the saddle stitching, because the data of the final page is rasterized immediately after the first page, when the job data of the final page is not received at the timing at which the rasterizing process for the data of the first page is finished, the waiting time for the reception of the job data of the final page is caused. As a result, the efficiency of the printing is deteriorated.

In Japanese Patent Application Publication No. 2013-212636, it is disclosed that in case that data is rasterized in the order from the front page, when the binding format is the ring binding and the final page is a blank page, the printing is started without waiting for the finish of the rasterizing process for the data of the final page. However, this technology can be applied only to the case in which the binding format is the ring binding and the final page is a blank page. Therefore, in case that the final page is not a blank page, the print cannot be started unless the rasterizing process for the data of the final page is finished.

SUMMARY

A print control device of one or more embodiments of the present invention, comprises:

a receiver configured to receive a print job; and a processor configured to generate image data by rasterizing data of each page of the print job in parallel with a reception of the print job, and to control a page order for rasterizing the data of each page of the print job, wherein the processor rasterizes the data of each page, which has been received, in an order from a front page until a finish of a reception of data of a predetermined page determined according to a binding format of an output document to be prepared by the print job, the predetermined page including the data of which the print control device is encouraged to wait for the finish of the reception, and after the reception of the data of the predetermined page is finished, the processor controls the page order so as to optimally rasterize the data of each page, which has not been rasterized, according to the binding format.

When a position where a blank page is inserted is designated in the print job, the processor controls the page order including the blank page The predetermined page is a last page among pages including the data to be rasterized.

The predetermined page is a third page when the binding format is a side stitching or a perfect binding of a case binding.

The predetermined page is a top page of pages that consecutively precede a last page among pages to be printed on a first recording sheet.

When a total number of pages of the print job is N and a number of pages in which data has been rasterized up to the finish of the reception of the data of the predetermined page is n, in case that the binding format is a saddle stitching, after the reception of the data of the predetermined page is finished, the processor controls the page order so as to rasterize the data of Nth page to (N−n+1)th page in an order from the Nth page to the (N−n+1)th page and then to rasterize the data of each page, which has not been rasterized, in an order from (n+1)th page and (N−n)th page to middle pages page by page alternately.

When the binding format is a side stitching or a perfect binding of a case binding, after the reception of the data of the predetermined page is finished, when a rasterizing process for the data of the front page and a second page is finished, the processor controls the page order so as to rasterize the data of remaining pages, which has not been rasterized, in an order of a reception of data, and when the rasterizing process for the data of the front page and the second page is not finished, the processor controls the page order so as to rasterize the data of a third page to the final page in an order from the third page to the final page and then to rasterize the data of remaining pages, which has not been rasterized, in the order of the reception of the data.

When the binding format is a ring binding, after the reception of the data of the predetermined page is finished, the processor controls the page order so as to rasterize the data of the final page and a previous page of the final page and then to rasterize the data of remaining pages, which has not been rasterized, in an order of a reception of data.

BRIEF DESCRIPTION OF THE DRAWINGS

One or more embodiments of the present invention will become more fully understood from the detailed description given hereinafter and the accompanying drawings given by way of illustration only, and thus are not intended as a definition of the limits of the present invention, and wherein:

FIGS. 2A to 2C are explanatory views showing the RIP order in case that the binding format is the saddle stitching;

FIGS. 3A to 3C are explanatory views showing the RIP order in case that the binding format is the saddle stitching and blank pages are inserted;

FIGS. 4A to 4C are explanatory views showing the RIP order in case that the binding format is the side stitching (or the perfect binding);

FIGS. 5A to 5C are explanatory views showing the RIP order in case that the binding format is the side stitching and the blank pages are inserted;

FIGS. 6A to 6C are explanatory views showing the RIP order in case that the binding format is the side stitching or the perfect binding and the reception finish waiting page is set to the third page;

FIGS. 7A to 7C are explanatory views showing the RIP order in case that the binding format is the side stitching or the perfect binding, blank pages are inserted and the reception finish waiting page is set to the third page in case that blank pages are inserted;

FIGS. 8A to 8C are explanatory views showing the RIP order in case that the binding format is the ring binding;

FIGS. 9A to 9D are explanatory views showing the RIP order in case that the binding format is the ring binding and the blank pages are inserted;

FIG. 10 is a flowchart showing the process for controlling the RIP order in which the print control device according to one or more embodiments that carry out the rasterizing process;

FIG. 19 is a view showing various types of the binding formats;

FIG. 21 is a view showing the page allocation (pagination) of the pages to be printed on each recording sheet in each binding format;

FIGS. 22A to 22D are views showing the ring binding process;

DETAILED DESCRIPTION

Hereinafter, embodiments of the present invention will be explained with reference to the accompanying drawings.

Figure 1:
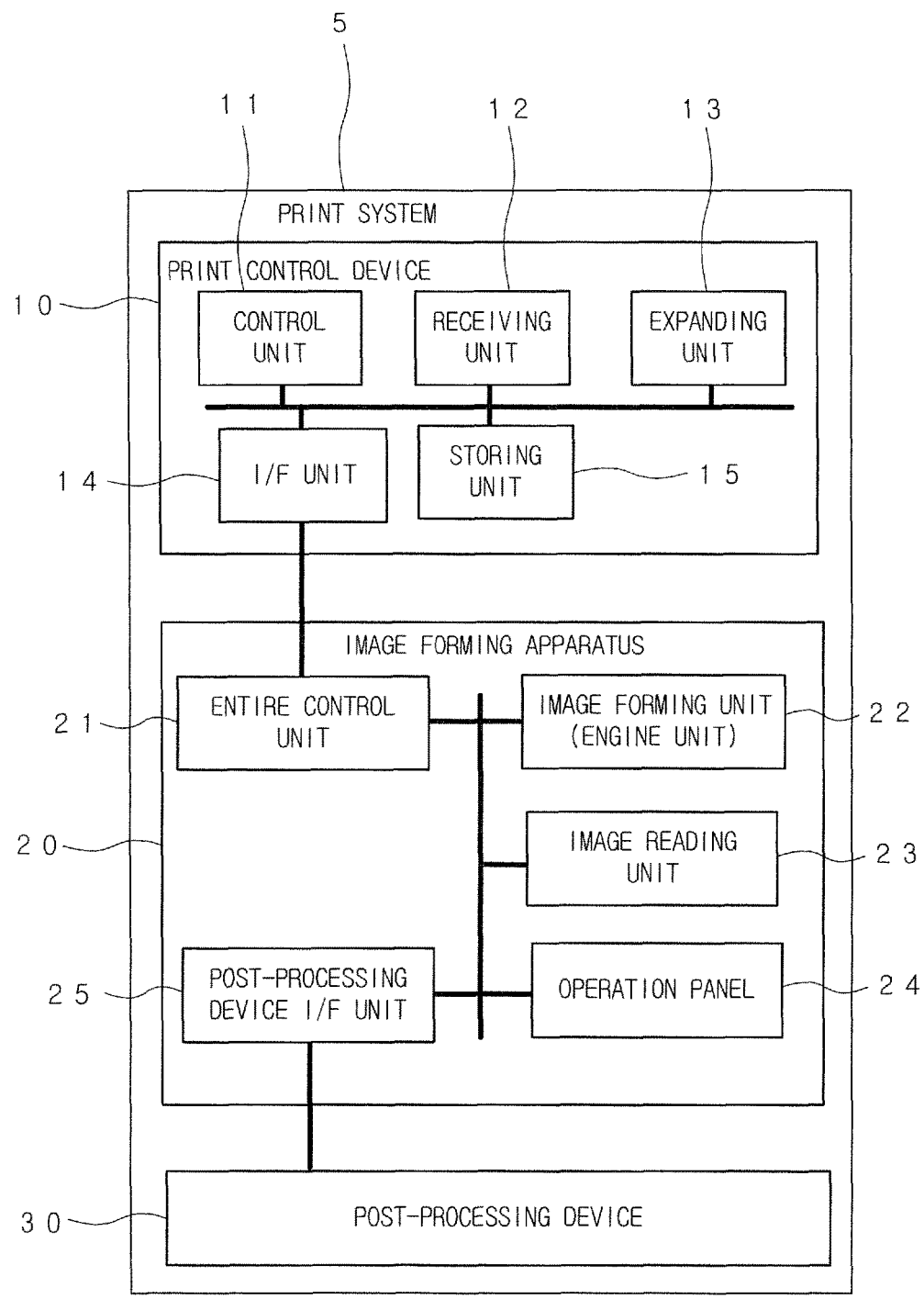
FIG. 1 is a block diagram showing the configuration of the print system according to one or more embodiments.

FIG. 1 shows an example of the print system 5 according to one or more embodiments. The print system 5 comprises a print control device 10 for receiving a print job and rasterizing the data of each page to generate an image data, an image forming apparatus 20 for printing an image on a recording sheet in accordance with the image data generated by the print control device 10 and a post-processing device 30 for carrying out the post-processing, such as the bookbinding process and the like, for the recording sheets output from the image forming apparatus 20.

The print system 5 is connected with an image processing device via a network, such as a LAN (Local Area Network) or the like, and receives a print job from the image processing device. In the print job, the contents of each page are described in the PDL.

The print control device 10 comprises a control unit 11, a receiving unit 12, an expanding unit 13, an I/F (Interface) unit 14, a storing unit 15 and the like. The control unit 11 comprises a CPU (Central Processing Unit) and the like. The storing unit 15 comprises a ROM (Read Only Memory), a RAM (Random Access Memory), a nonvolatile memory, a hard disk drive, and the like.

The receiving unit 12 receives a print job from the information processing device connected via the network. The expanding unit 13 generates an image data by rasterizing (RIP) the data of each page included in the print job received by the receiving unit 12 in parallel with the reception of the print job by the receiving unit 12. The control unit 11 controls the page order for rasterizing the data of each page of the print job by the expanding unit 13.

The processing time for rasterizing the data of each page included in the print job by the expanding unit 13 is longer than the time for receiving the print job by the receiving unit 12. Therefore, even if the data is rasterized in parallel with the reception of the print job, the reception of the print job is finished before the finish of the rasterizing process. As a result, after the print job is received, the remaining rasterizing process is carried out.

In the storing unit 15, the programs to be executed by the CPU of the control unit 11 are stored. By executing the programs by the CPU of the control unit 11, the function of the print control device 10 is realized. In the storing unit 15, the print job received by the receiving unit 12, the image data obtained by expanding the job in the expanding unit 13, the intermediate data generated during the expansion of the job, and the like are stored. Further, the storing unit 15 is used as a work memory for storing various types of data when the CPU of the control unit 11 executes the programs.

The I/F unit 14 receives and transmits various data between the print control device 10 and the image forming apparatus 20. The image data generated by the print control device 10 is transmitted to the image forming apparatus 20 via the I/F unit 14.

The image forming apparatus 20 is so-called multi-function peripheral which has the copy function for printing an image of an original on a recording sheet by optically reading the original, the scan function for storing the image data of the read original as a file and transmitting the image data to an external terminal via the network, the print function for printing out an image on a recording sheet in accordance with the image data transmitted from the print control device 10, and the like.

The image forming apparatus 20 comprises an entire control unit 21, an image forming unit 22, an image reading unit 23, an operation panel 24, a post-processing device I/F unit 25, and the like, which are connected with each other via a bus.

The entire control unit 21 comprises a CPU, a ROM, a RAM, a nonvolatile memory, a hard disk drive, an I/F unit for connecting with the print control device 10, a network communication unit, and the like. By executing the programs stored in the ROM and the like, the CPU controls the operation of the image forming apparatus 20.

The image forming unit 22 is so-called engine unit which has the function for forming and printing an image corresponding to the image data on the recording sheet. In one or more embodiments, the image forming unit 22 is configured as a so-called laser printer which comprises a conveying device for the recording sheet, a photoconductive drum, a charging device, a laser unit, a developing device, a transfer and separation device, a cleaning device and a fixing device, and which forms an image by the electrophotographic process. Alternatively, in the image forming unit 22, an image may be formed by another method.

The image reading unit 23 has the function for obtaining the image data corresponding to the original by optically reading the original.

The operation panel 24 comprises a display unit and an operating unit. The display unit comprises a liquid crystal display (LCD), and the like, and has the function for displaying various types of operation windows, setting windows and the like. The operating unit comprises various types of switches, such as a start button and the like, a touch panel provided on the physical screen of the display unit, and the like. The touch panel detects the coordinate position on which the physical screen of the display unit is pressed down by using a touch pen, the user's finger or the like.

The post-processing device I/F unit 25 has the function for transmitting the instruction relating to the bookbinding process and the like, to the post-processing device 30.

The post-processing device 30 stacks the recording sheets output from the image forming apparatus 20 and carries out the bookbinding process for the recording sheets. The post-processing device 30 can carry out the bookbinding process in various types of binding formats, such as the saddle stitching, the side stitching, the perfect binding, the ring binding, and the like.

Next, the process carried out by the print control device 10 will be explained.

The print control device 10 rasterizes the data of each page of the print job (RIP) in parallel with the reception of the print job. Further, the print control device 10 dynamically controls the page order for rasterizing the data of each page (RIP order) according to the binding format, the situation in which the blank pages are inserted, the situation of the reception of the print job and the progress status of the rasterizing process.

In detail, until the reception of the data of the predetermined page (hereinafter, referred to as "reception finish waiting page") is finished since the reception of the print job is started, the data of the page, which has been received is sequentially rasterized in the order from the front page. The reception finish waiting page is a page including the data of which the print control device 10 is encouraged to wait for the finish of the reception.

The reception finish waiting page is determined according to the designated binding format and the situation in which the blank pages are inserted. For example, in case of the saddle stitching, the reception finish waiting page is the last page among the pages including the data to be rasterized. In case of the side stitching, the reception finish waiting page is the third page (in case that the blank page is inserted, the reception finish waiting page is the last page including the data to be rasterized, among the first to the third pages including the blank page.). The designation of the binding format and the insertion of the blank pages may be set in the received print job or may be set by receiving the command via the operation panel or the like of the print system 5.

After the reception of the data of the reception finish waiting page is finished, the data of each page, which has not been rasterized, is rasterized in the page order in which the data is optimally rasterized according to the designated binding format (this order is referred to as the optimal RIP order). The page order in which the print control device 10 actually rasterizes the data of each page is referred to as the dynamic RIP order. The page order in which the data is optimally rasterized according to the designated binding format (optimal RIP order) is the page order in which the image forming apparatus 20 prints the images on the recording sheets when the print document is prepared in the designated binding format. In the identical recording sheet, the page order is the order from the page to be printed on the front surface (the surface on which the image is printed initially) to the page to be printed on the rear surface (the surface on which the image is printed subsequently). In each of the front surface and the rear surface, the page order is the order of the reception of the data.

FIGS. 2A to 2C show the RIP orders in case that the binding format is the saddle stitching. FIG. 2A shows the job configuration of the received print job and a conventional RIP order. In this print job, the first to the eighth pages are provided. Conventionally, the data of each page is sequentially rasterized in the order of the reception of the data, that is, from the front page to the final page. In this print job, the blank page is not inserted.

FIG. 2B shows the optimal RIP order and the dynamic RIP order in case that the data of this print job is rasterized. When the total number of the pages including the data to be rasterized is N, in case of the saddle stitching, the optimal RIP order is 1, N, 2, N−1, 3, N−2, . . . , N/2 and N/2+1. In this example, because N is 8, the optimal RIP order is 1, 8, 2, 7, 3, 6, 4 and 5. The reception finish waiting page is the last page among the pages including the data to be rasterized (in this example, the eighth page). In each drawing, the reception finish waiting page is hatched.

Until the reception of the reception finish waiting page is finished, the print control device 10 rasterizes (RIP) the data in the order from the front page. In the example of FIG. 2B, at the timing of the finish of the reception of the reception finish waiting page, the RIP for the data of the front page and the second page is finished. After the reception of the reception finish waiting page is finished, because the print control device 10 carries out the RIP for the data of the remaining pages (except the first page and the second page) in the optimal RIP order, the RIP is carried out for the data in the page order of 8, 7, 3, 6, 4 and 5. In each drawing, the pages in which the data has been rasterized up to the timing of the finish of the reception of the reception finish waiting page are grayed.

FIG. 2C shows the case in which the RIP for the data of the front page to the third page is finished at the timing of the finish of the reception of the reception finish waiting page. After the reception of the reception finish waiting page is finished, because the print control device 10 carries out the RIP for the data of the remaining pages (except the first to the third pages) in the optimal RIP order, the RIP is carried out for the data in the page order of 8, 7, 6, 4 and 5.

In the saddle stitching, when the total number of the pages including the data to be rasterized in the print job is N and the number of the pages in which the data has been rasterized up to the timing of the finish of the reception of the reception finish waiting page is n, the RIP for the data of the first page to the nth page is carried out until the reception of the reception finish waiting page is finished. After the reception of the reception finish waiting page is finished, the RIP for the data of the Nth page to the (N−n+1)th page is sequentially carried out. Then, the RIP for the data is carried out in the order from the (n+1)th page and the (N−n)th page to the middle pages (the (N/2)th page and the (N/2+1)th page).

FIGS. 3A to 3C show the example of the RIP order in case that the binding format is the saddle stitching and blank pages are inserted. FIG. 3A shows the job configuration of the received print job and a conventional RIP order. In this print job, the first to the sixth pages are provided, and one blank page is inserted between the first page and the second page and one blank page is inserted after the sixth page. The total number of the pages including the blank pages is 8.

FIG. 3B shows the optimal RIP order and the dynamic RIP order in case that the data of this print job is rasterized. The optimal RIP order is 1, 8, 2, 7, 3, 6, 4 and 5 which are page numbers counted when the blank pages are inserted. Because the blank pages are inserted at the second page and the eighth page, the RIP process is not necessary for the second page and the eighth page. The reception finish waiting page is the last page among the pages including the data to be rasterized (the sixth page in case that the blank page is not inserted).

Until the reception of the reception finish waiting page is finished, the print control device 10 rasterizes (RIP) the data in the order from the front page. In the example of FIG. 3B, at the timing of the finish of the reception of the reception finish waiting page, the RIP for the data of the front to the third pages including the inserted blank page is finished. However, because the blank page is inserted at the second page, the RIP process is not carried out for the second page. After the reception of the reception finish waiting page is finished, the print control device 10 carries out the RIP for the data of the remaining pages (except the first to the third pages) in the optimal RIP order. The optimal RIP order for the remaining pages is the page order of 8, 7, 6, 4 and 5 which are page numbers counted when the blank pages are inserted. However, because the eighth page is the blank page, the RIP process is not carried out for the eighth page. Therefore, the RIP process is actually carried out in the page order of 7, 6, 4 and 5 which are page numbers counted when the blank pages are inserted.

FIG. 3C shows the case in which the RIP for the data of the front page to the fourth page including the inserted blank page is finished at the timing of the finish of the reception of the reception finish waiting page. However, because the blank page is inserted at the second page, the RIP process is not carried out for the second page. After the reception of the reception finish waiting page is finished, because the print control device 10 carries out the RIP for the data of the remaining pages (except the first to the fourth pages) in the optimal RIP order, the RIP is carried out for the data in the page order of 8, 7, 6 and 5. However, because the eighth page is the blank page, the RIP process is not carried out for the eighth page. Therefore, the RIP process is actually carried out in the page order of 7, 6 and 5 which are page numbers counted when the blank pages are inserted.

In the saddle stitching, when the total number of the pages including the data to be rasterized in the print job is N, the number of the inserted blank pages is A, the number of the pages in which the data has been rasterized up to the timing of the finish of the reception of the reception finish waiting page is n and the number of the blank pages inserted before the last page among the pages including the data which has been rasterized up to the timing of the finish of the reception of the reception finish waiting page is a, the RIP for the data of the first page to the nth page (the (n+a)th page in case that the blank pages are included) is carried out in the order of the reception of the data until the reception of the reception finish waiting page is finished. After the reception of the reception finish waiting page is finished, the RIP for the data of the (N+A)th page to the (N+A−(n+a)+1)th page is sequentially carried out. However, the RIP is not necessary for the blank pages. Then, the RIP for the data is carried out in the order from the (n+a+1)th page and the (N+A−(n+a))th page to the middle pages (the (N+A/2)th page and the ((N+A)/2+1)th page) (except the blank pages).

FIGS. 4A to 4C show the RIP orders in case that the binding format is the side stitching (or the perfect binding) of the case binding. FIG. 4A shows the job configuration of the received print job and a conventional RIP order. In this print job, the first to the eighth pages are provided. Conventionally, the data of each page is sequentially rasterized in the order of the reception of the data, that is, from the front page to the final page. In this print job, the blank page is not inserted.

FIG. 4B shows the optimal RIP order and the dynamic RIP order in case that the data of this print job is rasterized. When the total number of the pages including the data to be rasterized is N, in case of the side stitching, the optimal RIP order is 3, 4, 5, 6, . . . , N−1, N, 1 and 2. In this example, because N is 8, the optimal RIP order is 3, 4, 5, 6, 7, 8, 1 and 2. The reception finish waiting page is the eighth page which is the final page.

Until the reception of the reception finish waiting page is finished, the print control device 10 rasterizes the data in the order from the front page. In the example of FIG. 4B, at the timing of the finish of the reception of the reception finish waiting page, the RIP for the data of only the front page is finished. After the reception of the reception finish waiting page is finished, because the print control device 10 carries out the RIP for the data of the remaining pages (except the first page) in the optimal RIP order, the RIP is carried out for the data in the page order of 3, 4, 5, 6, 7, 8 and 2.

FIG. 4C shows the case in which the RIP for the data of the front page and the second page is finished at the timing of the finish of the reception of the reception finish waiting page. After the reception of the reception finish waiting page is finished, because the print control device 10 carries out the RIP for the data of the remaining pages (except the first page and the second page) in the optimal RIP order, the RIP is carried out for the data in the page order of 3, 4, 5, 6, 7 and 8.

In the side stitching, when the RIP for the data of the first page and the second page is finished at the timing of the finish of the reception of the reception finish waiting page, the RIP process is continued in the order of the reception of the data without changing the RIP order. In case that the RIP for the data of the first page and the second page is not finished at the timing of the finish of the reception of the reception finish waiting page, the RIP process which is carried out in the order of the reception of the data is stopped. The RIP process is sequentially carried out in the order from the third page to the final page. Then, the above stopped RIP process is restarted to rasterize the unprocessed data of the first page and the second page.

FIGS. 5A to 5C show the example of the RIP order in case that the binding format is the side stitching (or the perfect binding) of the case binding and blank pages are inserted. FIG. 5A shows the job configuration of the received print job and a conventional RIP order. In this print job, the first to the sixth pages are provided, and one blank page is inserted between the first page and the second page and one blank page is inserted between the fifth page and the sixth page. The total number of the pages including the blank pages is 8.

FIG. 5B shows the optimal RIP order and the dynamic RIP order in case that the data of this print job is rasterized. The optimal RIP order is 3, 4, 5, 6, 7, 8, 1 and 2 which are page numbers counted when the blank pages are inserted. Because the blank pages are inserted at the second page and the seventh page, the RIP process is not necessary for the second page and the seventh page. The reception finish waiting page is the final page (the eighth page in case that the blank pages are inserted).

Until the reception of the reception finish waiting page is finished, the print control device 10 rasterizes the data in the order from the front page (in the order of the reception of the data). In the example of FIG. 5B, at the timing of the finish of the reception of the reception finish waiting page, the RIP for the data of only the front page in case that the blank pages are inserted is finished. After the reception of the reception finish waiting page is finished, the print control device 10 carries out the RIP for the data of the remaining pages (except the first page) in the optimal RIP order. The optimal RIP order for the remaining pages is the page order of 3, 4, 5, 6, 7, 8 and 2 which are page numbers counted when the blank pages are inserted. However, because the second page and the seventh page are the blank pages, the RIP process is not carried out for the second page and the seventh page. Therefore, the RIP process is actually carried out in the page order of 3, 4, 5, 6 and 8 which are page numbers counted when the blank pages are inserted.

FIG. 5C shows the case in which the RIP for the data of a part of the first page is finished at the timing of the finish of the reception of the reception finish waiting page. After the reception of the reception finish waiting page is finished, because the print control device 10 carries out the RIP for the data of the remaining pages (including the unprocessed data of the first page) in the optimal RIP order, the RIP is carried out for the data in the page order of 3, 4, 5, 6, 7, 8, 1 and 2. However, because the second page and the seventh page are the blank pages, the RIP process is not carried out for the second page and the seventh page. Therefore, the RIP process is actually carried out in the page order of 3, 4, 5, 6, 7, 8 and 1 (the unprocessed data of the first page) which are page numbers counted when the blank pages are inserted.

In the side stitching, when the RIP for the data of the first and the second pages including the inserted blank page is finished at the timing of the finish of the reception of the reception finish waiting page, the RIP process is continued in the order of the reception of the data without changing the RIP order. In case that the RIP for the data of the first and the second pages including the inserted blank page is not finished at the timing of the finish of the reception of the reception finish waiting page, the RIP process which is carried out in the order of the reception of the data is stopped. The RIP process is sequentially carried out in the order from the third page to the final page. Then, the above stopped RIP process is restarted to rasterize the unprocessed data of the first page and the second page.

As shown in FIGS. 6A to 6C and FIGS. 7A to 7C, in case of the binding format is the side stitching or the perfect binding of the case binding, the reception finish waiting page may be set to the third page (When the blank sheet is inserted, the reception finish waiting page may be set to the third page in which the blank page is also counted.). With respect to the third page and after, because the optimal RIP order is the same as the order of the reception of the data, by starting the RIP process for the data of the third page when the reception of the data of the third page is finished, it is possible to finish the RIP for the data of the pages to be printed on the first recording sheet soon and to accelerate the start of the printing of the image on the first recording sheet, as compared with the case in which the RIP process for the data of the third page is started when the reception of the data of the final page is finished.

FIGS. 8A to 8C show the RIP order in case that the binding format is the ring binding. FIG. 8A shows the job configuration of the received print job and a conventional RIP order. In this print job, the first to the eighth pages are provided. Conventionally, the data of each page is sequentially rasterized in the order of the reception of the data, that is, from the front page to the final page. In this print job, the blank page is not inserted.

FIG. 8B shows the optimal RIP order and the dynamic RIP order in case that the data of this print job is rasterized. When the total number of the pages including the data to be rasterized is N, in case of the ring binding, the optimal RIP order is N−1, N, 1, 2, . . . and N−2. In this example, because N is 8, the optimal RIP order is 7, 8, 1, 2, 3, 4, 5 and 5. The reception finish waiting page is the last page among the pages including the data to be rasterized. In this example, the reception finish waiting page is the eighth page.

Until the reception of the reception finish waiting page is finished, the print control device 10 rasterizes the data in the order from the front page. In the example of FIG. 8B, at the timing of the finish of the reception of the reception finish waiting page, the RIP for the data of the front page to the third page is finished. After the reception of the reception finish waiting page is finished, because the print control device 10 carries out the RIP for the data of the remaining pages (except the first to the third pages) in the optimal RIP order, the RIP is carried out for the data in the page order of 7, 8, 4, 5 and 6.

FIG. 8C shows the case in which the RIP for the data of only the front page is finished at the timing of the finish of the reception of the reception finish waiting page. After the reception of the reception finish waiting page is finished, because the print control device 10 carries out the RIP for the data of the remaining pages (except the first page) in the optimal RIP order, the RIP is carried out for the data in the page order of 7, 8, 2, 3, 4, 5 and 6.

In the ring binding, until the reception of the reception finish waiting page is finished, the RIP process is carried out in the order of the reception of the data. At the timing of the finish of the reception of the reception finish waiting page, the RIP process which is carried out in the order of the reception of the data is stopped. After the RIP process is carried out for the data of the (N−1)th page and the Nth page, the above stopped RIP process which is carried out in the order of the reception of the data is restarted.

FIGS. 9A to 9D show the example of the RIP order in case that the binding format is the ring binding and blank pages are inserted. FIG. 9A shows the job configuration of the received print job and a conventional RIP order. In this print job, the first to the sixth pages are provided, and one blank page is inserted between the first page and the second page and one blank page is inserted between the fifth page and the sixth page. The total number of the pages including the blank pages is 8.

FIG. 9B shows the optimal RIP order and the dynamic RIP order in case that the data of this print job is rasterized. The optimal RIP order is 7, 8, 1, 2, 3, 4, 5 and 6 which are page numbers counted when the blank pages are inserted. Because the blank pages are inserted at the second page and the seventh page, the RIP process is not necessary for the second page and the seventh page. The reception finish waiting page is the final page.

Until the reception of the reception finish waiting page is finished, the print control device 10 rasterizes the data in the order from the front page (in the order of the reception of the data). In the example of FIG. 9B, at the timing of the finish of the reception of the reception finish waiting page, the RIP for the data of the front to the third pages including the inserted blank page is finished. Because the second page is the blank page, the RIP process is not carried out for the second page. After the reception of the reception finish waiting page is finished, the print control device 10 carries out the RIP for the data of the remaining pages (except the first to the third pages) in the optimal RIP order. The optimal RIP order for the remaining pages is the page order of 7, 8, 4, 5 and 6 which are page numbers counted when the blank pages are inserted. However, because the seventh page is the blank page, the RIP process is not carried out for the seventh page. Therefore, the RIP process is actually carried out in the page order of 8, 4, 5 and 6 which are page numbers counted when the blank pages are inserted.

FIG. 9C shows the case in which the RIP for the data of the first page is finished at the timing of the finish of the reception of the reception finish waiting page. After the reception of the reception finish waiting page is finished, the print control device 10 carries out the RIP for the data of the remaining pages (except the first page) in the optimal RIP order. The optimal RIP order for the remaining pages is the page order of 7, 8, 2, 3, 4, 5 and 6 which are page numbers counted when the blank pages are inserted. However, because the second page and the seventh page are the blank pages, the RIP process is not carried out for the second page and the seventh page. Therefore, the RIP process is actually carried out in the page order of 8, 3, 4, 5 and 6 which are page numbers counted when the blank pages are inserted.

FIG. 9D shows the case in which the RIP for the data of a part of the first page is finished at the timing of the finish of the reception of the reception finish waiting page. After the reception of the reception finish waiting page is finished, because the print control device 10 carries out the RIP for the data of the remaining pages (including the unprocessed data of the first page) in the optimal RIP order, the RIP is carried out for the data in the page order of 7, 8, 1, 2, 3, 4, 5 and 6 which are page numbers counted when the blank pages are inserted. However, because the second page and the seventh page are the blank pages, the RIP process is not carried out for the second page and the seventh page. Therefore, the RIP process is actually carried out in the page order of 8, 1 (the unprocessed data of the first page), 3, 4, 5 and 6 which are page numbers counted when the blank pages are inserted.

In the ring binding, until the reception of the reception finish waiting page is finished, the RIP process is carried out in the order of the reception of the data. At the timing of the finish of the reception of the reception finish waiting page, the RIP process which is carried out in the order of the reception of the data is stopped. After the RIP process is carried out for the data of the (N−1)th page and the Nth page except the inserted blank page, the above stopped RIP process which is carried out in the order of the reception of the data is restarted.

FIG. 10 is a flowchart showing the process for controlling the RIP order in the print control device 10. This process is carried out at the same timing as the start of the reception of the print job. Firstly, the optimal RIP order for the print job is determined in accordance with the designated binding format (Step S101). Next, the reception finish waiting page is specified in accordance with the designated binding format and the instruction for inserting the blank page (Step S102).

Until the reception of the reception finish waiting page is finished (Step S103; No), the print control device 10 carries out the RIP process for the data of the received pages in the order of the reception of the data (Step S104).

When the reception of the reception finish waiting page is finished (Step S103; Yes), the current RIP process (the RIP process which is carried out in the order of the reception of the data) is stopped (Step S105). Then, the print control device 10 searches the page including the data which has not been rasterized, in the order from the top of the optimal RIP order (Step S106). When the page including the data which has not been rasterized is found (Step S107; Yes), the print control device 10 carries out the RIP process for the data of the page including the unrasterized data, which is firstly found by searching the page from the top of the optimal RIP order (Step S108). Then, the process returns to Step S106.

In case that the page including the data which has not been rasterized is not found (Step S107; No), the process is ended.

The print control device 10 sequentially transmits the image data which is obtained by the RIP process and the blank pages, to the image forming apparatus 20 in the optimal RIP order. At this time, after the print control device 10 finishes preparing the image data of the page to be transmitted to the image forming apparatus 20 next in the optimal RIP order, the print control device 10 transmits the image data of the above page to the image forming apparatus 20. With respect to the blank pages, the print control device 10 may transmit the image data of the blank page or may transmit the instruction for inserting the blank page.

When the image forming apparatus 20 receives the image data of the all pages (except the blank pages) to be printed on the next recording sheet in the designated binding format, the image forming apparatus 20 starts printing the images on the above next recording sheet. For example, in case of the saddle stitching, when the image forming apparatus 20 receives the image data of four pages which are the first page, the Nth page (N is the total number of pages), the second page and the (N−1)th page, the image forming apparatus 20 starts printing the images on the first recording sheet.

The post-processing device 30 stacks the recording sheets output from the image forming apparatus 20 in the output order. When the image forming apparatus 20 finishes printing the images on all of the recording sheets which are necessary for forming one booklet, the post-processing device 30 carries out the process for binding the recording sheets to form one booklet. For example, in case of the saddle stitching, the post-processing device 30 stacks the recording sheets output from the image forming apparatus 20. When the recording sheets required for the binding are stuck, the post-processing device 30 binds the center portion of the recording sheets by the staple and forms the booklet by 2-folding the recording sheets.

As described above, by dynamically changing the RIP order according to the binding format and the progress status of the rasterizing process at the time of the finish of the reception of the reception finish waiting page, it is possible to shorten the standby time which elapses until the start of the printing of the image on the first recording sheet used for the booklet, and shorten the time required until the finish of the printing.

In order to accelerate the start of the printing of the image on the first recording sheet, the reception finish waiting page is set as follows. That is, the reception finish waiting page is set to the top page of the pages that consecutively precede the last page among the pages to be printed on the first recording sheet. Because the printing of the image on the first recording sheet is started after the image data of all of the pages to be printed on the first recording sheet are received, it is possible to finish rasterizing the data of the pages to be printed on the first recording sheet sooner by setting the reception finish waiting page as described above.

For example, in case of the saddle stitching, four pages which are the first page, the Nth page, the second page and the (N−1)th page, are printed on the first recording sheet. The last page among the above four pages is the Nth page. The top page of the pages that consecutively precede from the Nth page is the (N−1)th page. Therefore, in case of the saddle stitching, the reception finish waiting page is set to the (N−1)th page. As compared with the case in which the print control device 10 waits for the finish of the reception of the data of the Nth page, it is possible to start the RIP process for the data of the required pages sooner.

In case of the side stitching or the perfect binding of the case binding, four pages which are the third page, the fourth page, the fifth page and the sixth page are printed on the first recording sheet. The last page among the above four pages is the sixth page. The top page of the pages that consecutively precede the sixth page is the third page. Therefore, in case of the side stitching or the perfect binding of the case binding, the reception finish waiting page is set to the third page.

In case of the ring binding, the Nth page and the (N−1)th page are printed on the first recording sheet. The last page among the pages to be printed on the first recording sheet is the Nth page. The top page of the pages that consecutively precede from the Nth page is the (N−1)th page. Therefore, in case of the ring binding, the reception finish waiting page is set to the (N−1)th page. As compared with the case in which the print control device 10 waits for the finish of the reception of the data of the Nth page, it is possible to start the RIP process for the data of the required pages sooner.

Figure 11:
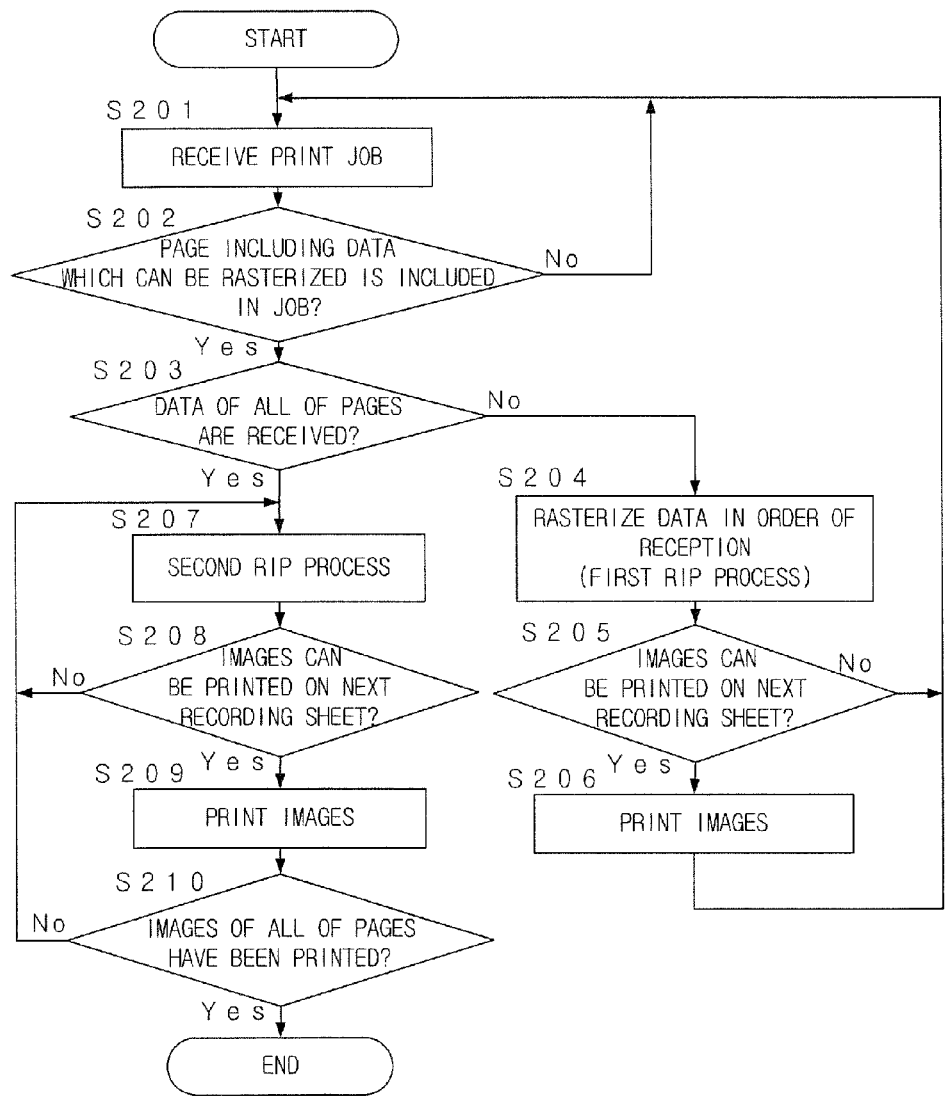
FIG. 11 is a flowchart showing the process for preparing the print document by dynamically controlling the RIP order according to the binding format in the print system.

FIG. 11 shows another process in case that the print system 5 prepares a print document. In this process, the algorithm for controlling the RIP order by the print control device 10 is different from that of the process shown in FIG. 10. However, the result of the process shown in FIG. 11 is the same as that of the process shown in FIG. 10. In the process shown in FIG. 11, the reception finish waiting page is set to the final page in all of the binding formats.

The print control device 10 starts the reception of the print job (Step S201). During the reception of the print job, in case that the page including the data which can be rasterized (the page including the data which has not been rasterized) is not included in the received data (Step S202; No), the process returns to Step S201 and the print control device 10 continues to receive the print job. When the page including the data which can be rasterized is included in the received data (Step S202; Yes), it is checked whether the reception of the data of all of the pages (the reception of the reception finish waiting page) is finished (Step S203).

In case that the reception of the data of the all of the pages is not finished (Step S203; No), the data of the page, which has not been rasterized is rasterized in the order of the reception (Step S204). Then, it is checked whether the image data of the all of the pages to be printed on the next recording sheet are received and the images can be printed on the next recording sheet (Step S205). In case that the images cannot be printed on the next recording sheet (Step S205; No), the process returns to Step S201 and the print control device 10 continues to receive the print job. When the images can be printed on the next recording sheet (Step S205; Yes), the images are printed on the above recording sheet (Step S206). Then, the process returns to Step S201 and the print control device 10 continues to receive the print job.

In case that the reception of the data of all of the pages is finished (Step S203; Yes), the second RIP process for rasterizing the data in the page order which is calculated according to the progress status of the rasterizing process and the binding format, is carried out (Step S207). The detail of the second RIP process will be explained.

It is checked whether the image data of the all of the pages to be printed on the next recording sheet are received and the images can be printed on the next recording sheet (Step S208). In case that the images cannot be printed on the next recording sheet (Step S208; No), the process returns to Step S207 and the print control device 10 continues the second RIP process. When the images can be printed on the next recording sheet (Step S207; Yes), the images are printed on the above recording sheet (Step S209).

Then, it is judged whether the printing of all of the pages used for forming one booklet is finished (Step S210). In case that the printing of all of the pages for forming one booklet is not finished (Step S210; No), the process returns to Step S207 and the print control device 10 continues the second RIP process. When the printing of all of the pages for forming one booklet is finished (Step S210; Yes), the process is ended.

The post-processing device 30 stacks the recording sheets output from the image forming apparatus 20 in the output order. When the printing of the images on the all of the recording sheets for forming one booklet is finished, the post-processing device 30 carries out the process for binding the recording sheets to form one booklet.

Figure 12:
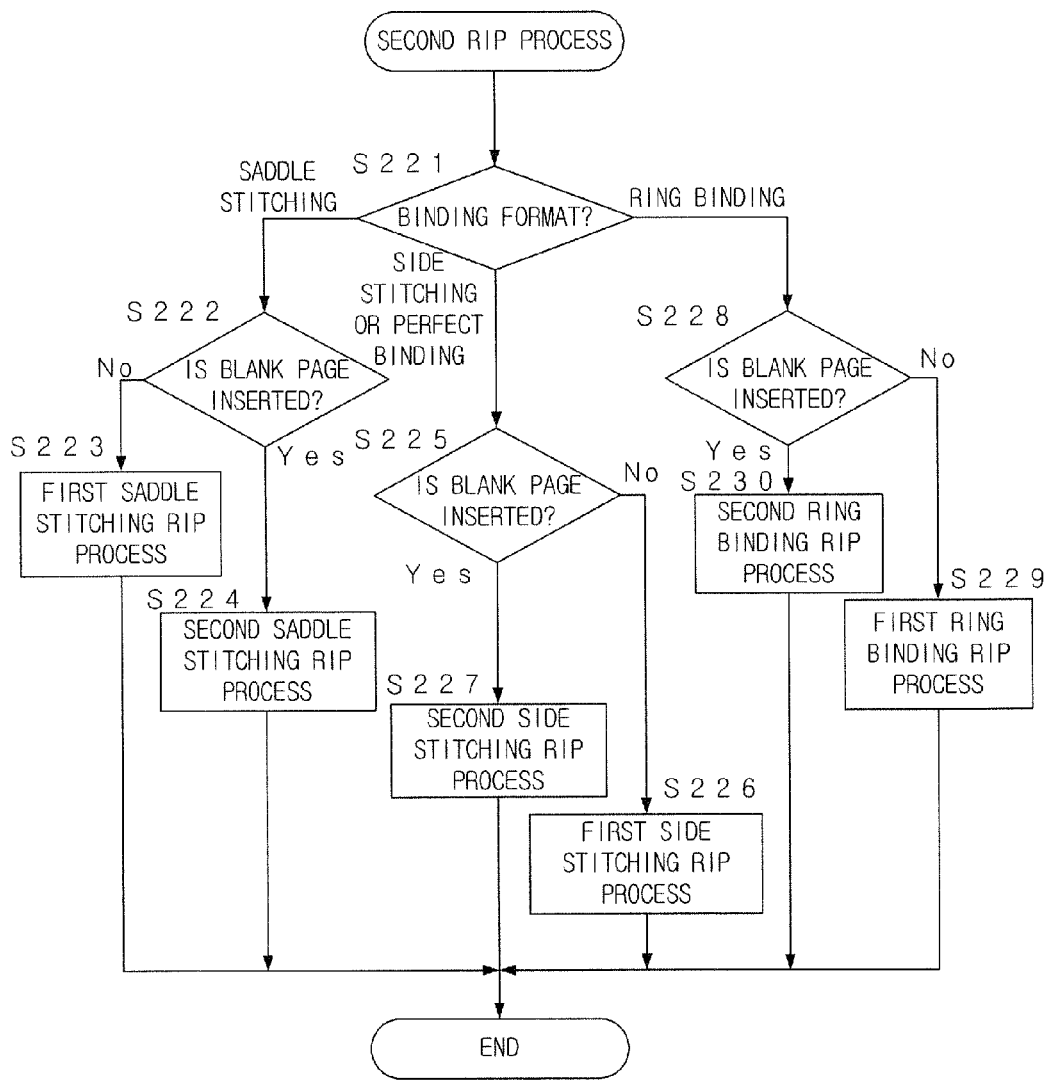
FIG. 12 is a flowchart showing the detail of the second RIP process (Step S207 in FIG. 11)

FIG. 12 shows the detail of the second RIP process (Step S207 in FIG. 11). Firstly, the designated binding format is judged (Step S221). In case that the designated binding format is the saddle stitching (Step S221; saddle stitching), it is judged whether the insertion of the blank page is instructed (Step S222). In case that the insertion of the blank page is not instructed (Step S222; No), the print control device 10 carries out the first saddle stitching RIP process (Step S223). When the insertion of the blank page is instructed (Step S222; Yes), the print control device 10 carries out the second saddle stitching RIP process (Step S224).

In case that the designated binding format is the side stitching (or the perfect binding) (Step S221; side stitching or perfect binding), it is judged whether the insertion of the blank page is instructed (Step S225). In case that the insertion of the blank page is not instructed (Step S225; No), the print control device 10 carries out the first side stitching RIP process (Step S226). When the insertion of the blank page is instructed (Step S225; Yes), the print control device 10 carries out the second side stitching RIP process (Step S227).

In case that the designated binding format is the ring binding (Step S221; ring binding), it is judged whether the insertion of the blank page is instructed (Step S228). In case that the insertion of the blank page is not instructed (Step S228; No), the print control device 10 carries out the first ring binding RIP process (Step S229). When the insertion of the blank page is instructed (Step S228; Yes), the print control device 10 carries out the second side stitching RIP process (Step S230).

Figure 13:
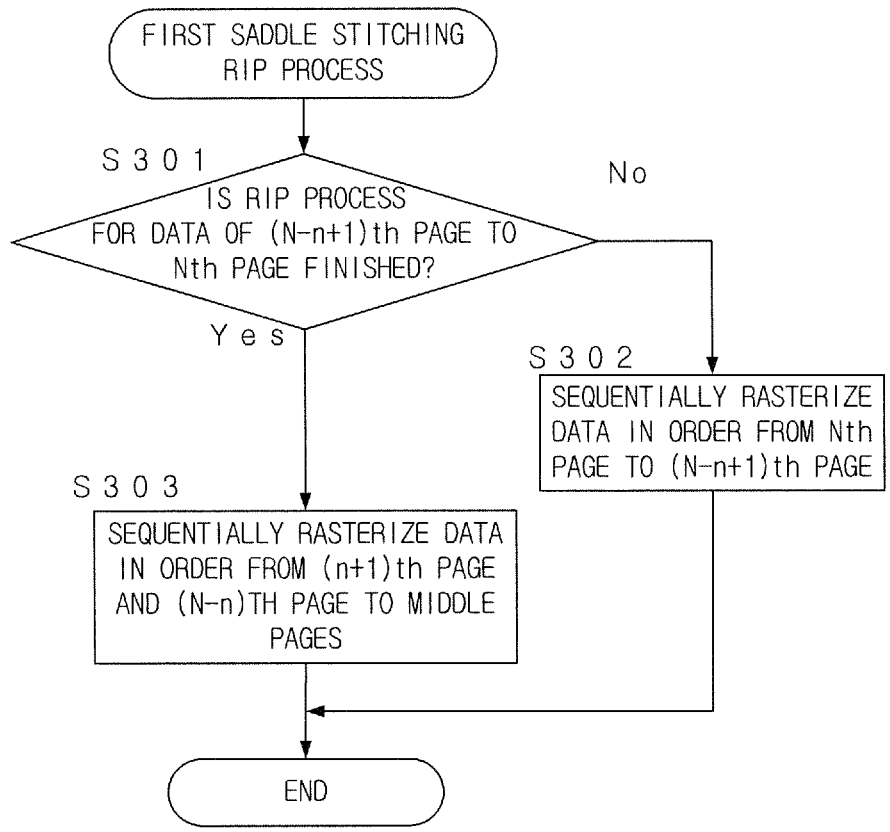
FIG. 13 is a flowchart showing the detail of the first saddle stitching RIP process (Step S223 in FIG. 12)
Figure 14:
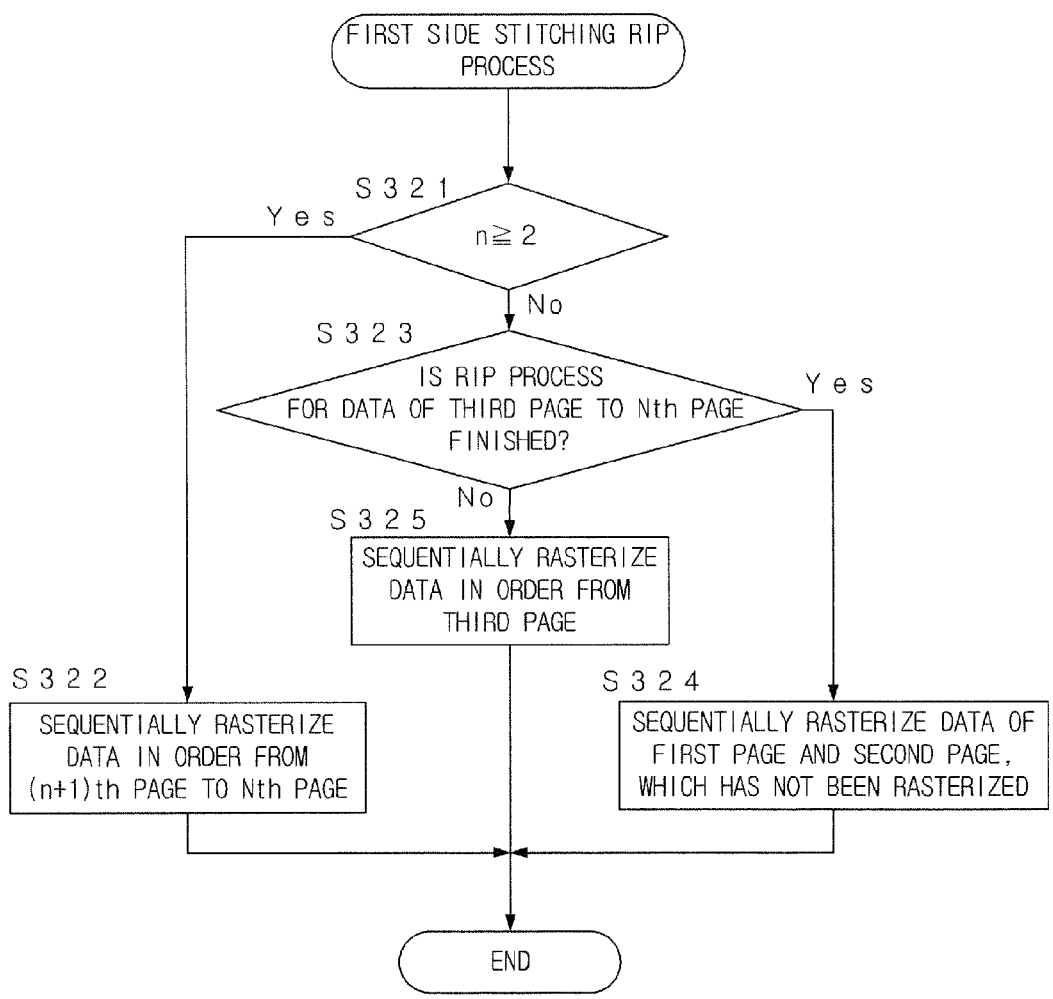
FIG. 14 is a flowchart showing the detail of the first side stitching RIP process (Step S226 in FIG. 12)
Figure 15:
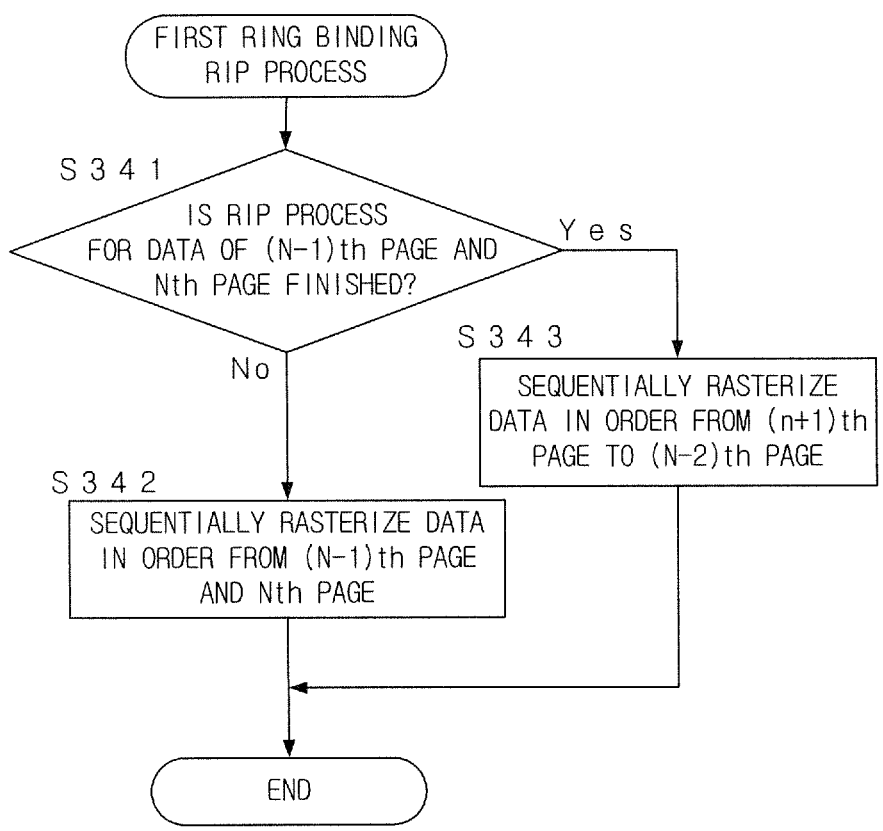
FIG. 15 is a flowchart showing the detail of the first ring binding RIP process (Step S229 in FIG. 12)

FIG. 13 is a flowchart showing the detail of the first saddle stitching RIP process (Step S223 in FIG. 12). In FIGS. 13 to 15, N is the total number of the pages including the data to be rasterized in the print job, and n is the number of the pages in which the data has been rasterized up to the timing of the finish of the reception of the data of all of the pages.

In case that the RIP for the data of the Nth page to the (N−n+1)th page is not finished (Step S301; No), the data is rasterized in the order from the Nth page to the (N−n+1)th page (Step S302). When the RIP for the data of the Nth page to the (N−n+1)th page is finished (Step S301; Yes), the RIP for the data is sequentially carried out in the order from the (n+1)th page and the (N−n)th page to the middle pages (the (N/2)th page and the (N/2+1)th page) (Step S303).

FIG. 14 is a flowchart showing the detail of the first side stitching RIP process (Step S226 in FIG. 12). In case that n is not less than 2 (n≥2) (Step S321; Yes), the data is rasterized in the order from the (n+1)th page to the Nth page (Step S322).

In case that n is less than 2 (Step S321; No), it is judged whether the RIP for the data of the third page to the Nth page is finished (Step S323). In case that the RIP for the data of the third page to the Nth page is not finished (Step S323; No), the data is sequentially rasterized in the order from the third page (Step S325). In case that the RIP for the data of the third page to the Nth page is finished (Step S323; Yes), the data of the first page and the second page, which has not been rasterized is sequentially rasterized (Step S324).

FIG. 15 is a flowchart showing the detail of the first ring binding RIP process (Step S229 in FIG. 12). In case that the RIP for the data of the (N−1)th page and the Nth page is not finished (Step S341; No), the data of the page including the data to be rasterized is sequentially rasterized in the order from the (N−1)th page and the Nth page (Step S342). When the RIP for the data of the (N−1)th page and the Nth page is finished (Step S341; Yes), the data is sequentially rasterized in the order from the (n+1)th page to the (N−2)th page (Step S343).

Figure 16:
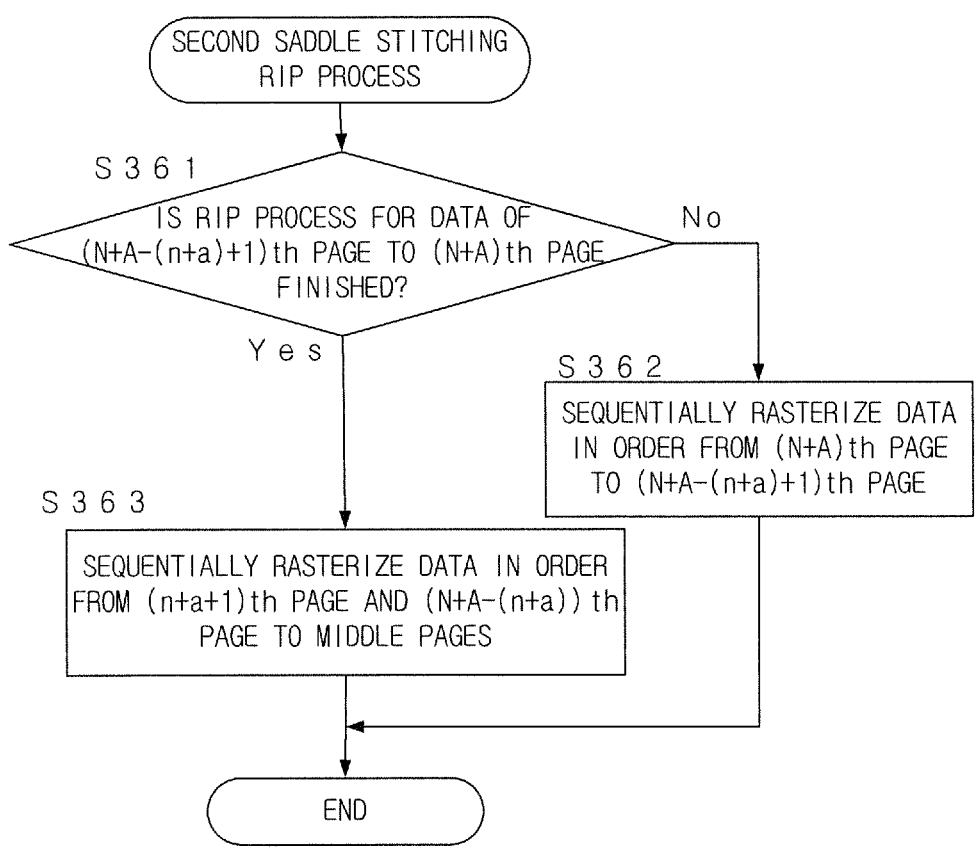
FIG. 16 is a flowchart showing the detail of the second saddle stitching RIP process (Step S224 in FIG. 12)
Figure 17:
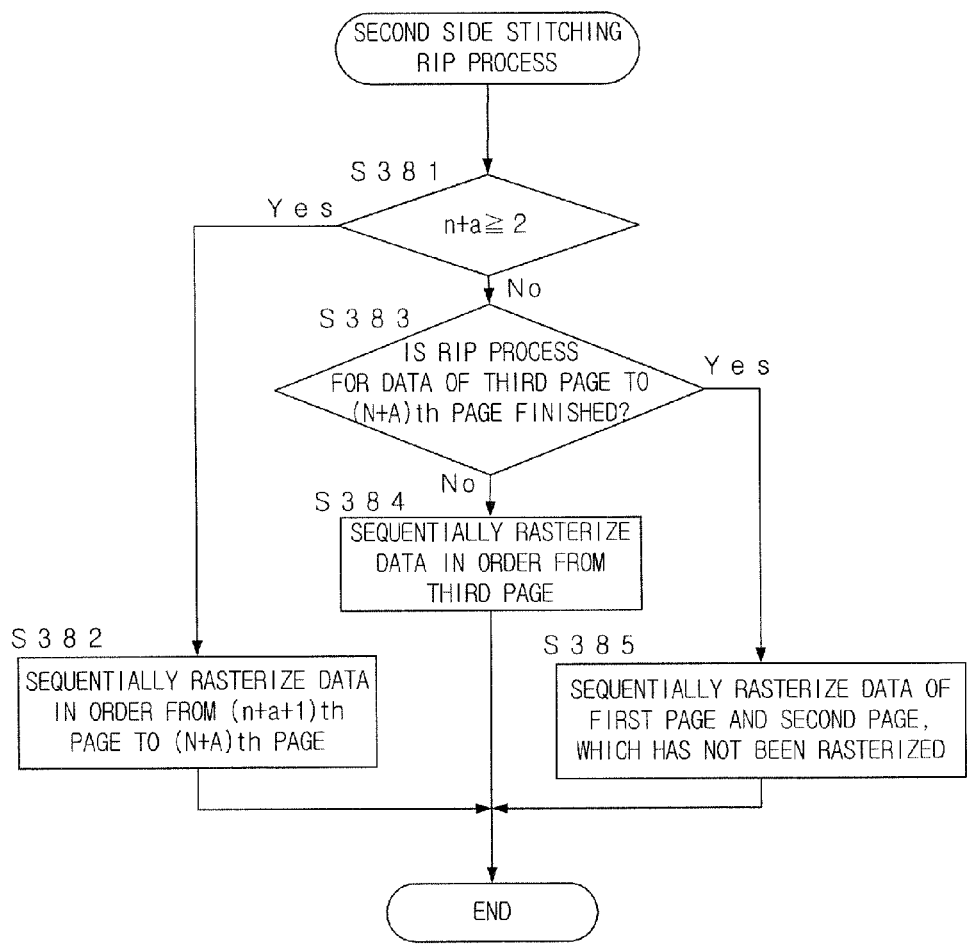
FIG. 17 is a flowchart showing the detail of the second side stitching RIP process (Step S227 in FIG. 12)
Figure 18:
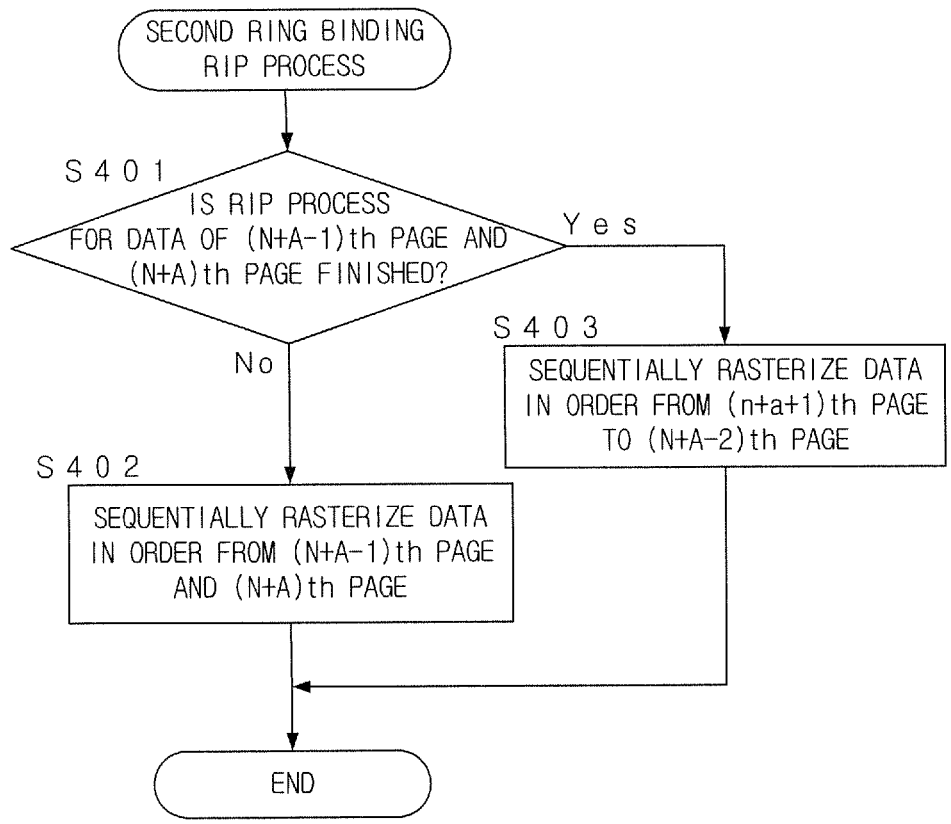
FIG. 18 is a flowchart showing the detail of the second ring binding RIP process (Step S230 in FIG. 12)
Figure 20:
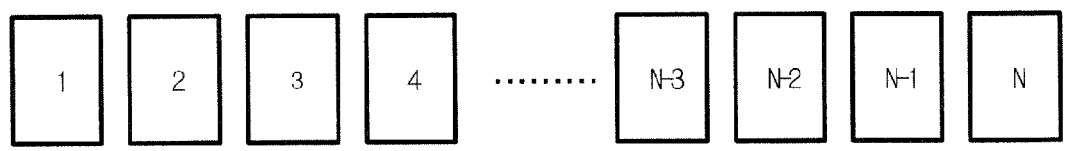
FIG. 20 is a view showing the page order of the original document.
Figure 23:
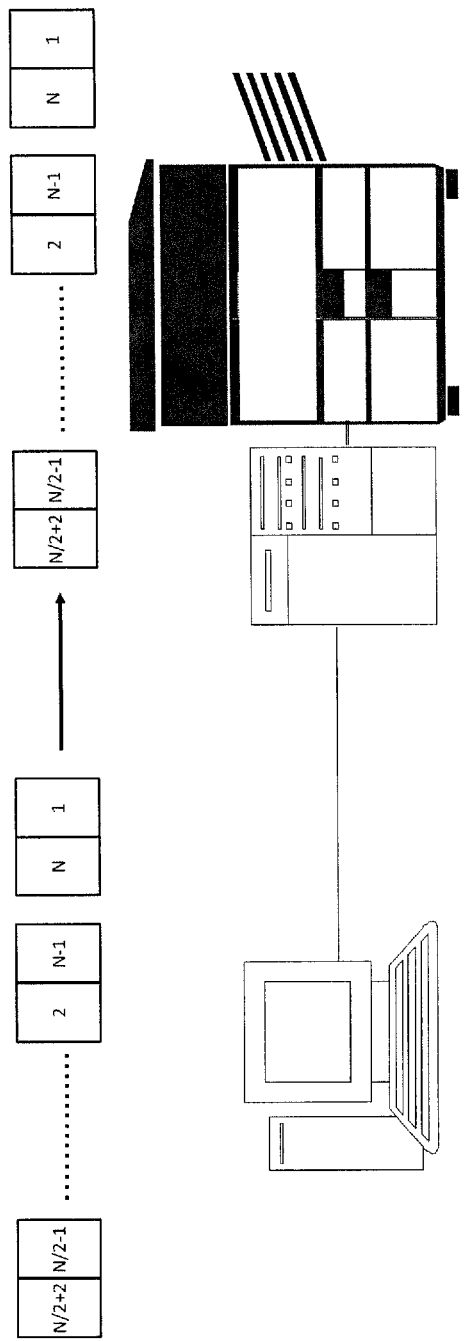
FIG. 23 is an explanatory view showing the situation in which the print job in which the pagination is performed in a terminal is transmitted to the image forming apparatus.
Figure 24:
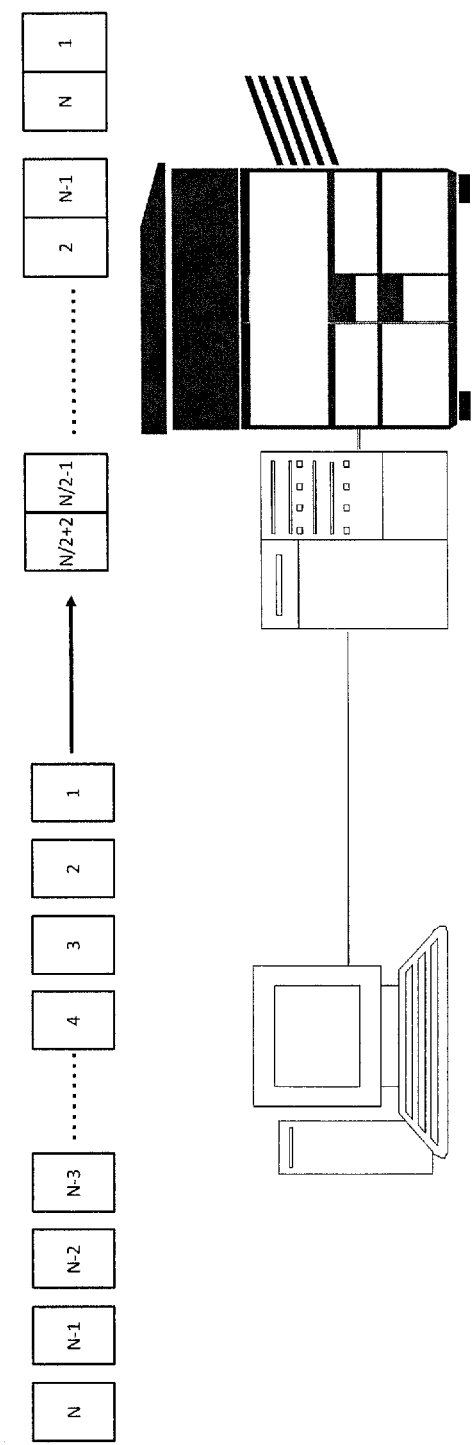
FIG. 24 is an explanatory view showing the situation in which a job data in which the pages are arranged in the page order which is the same as that of the original document is transmitted to the image forming apparatus and the image forming apparatus performs the pagination according to the binding format.

FIG. 16 is a flowchart showing the detail of the second saddle stitching RIP process (Step S224 in FIG. 12). In FIGS. 16 to 18, N is the total number of the pages including the data to be rasterized in the print job, A is the number of the inserted blank pages, n is the number of the pages in which the data has been rasterized up to the timing of the finish of the reception of the reception finish waiting page, and a is the number of the blank pages inserted before the last page among the pages including the data which has been rasterized up to the timing of the finish of the reception of the reception finish waiting page.

In case that the RIP for the data of the (N+A)th page to the (N+A−(n+a)+1)th page including the data to be rasterized is not finished (Step S361; No), the data of the page including the data to be rasterized is sequentially rasterized in the order from the (N+A)th page to the (N+A−(n+a)+1)th page (Step S362). When the RIP for the data of the (N+A)th page to the (N+A−(n+a)+1)th page including the data to be rasterized is finished (Step S361; Yes), the data of the page including the data to be rasterized is sequentially carried out in the order from the (n+a+1)th page and the (N+A−(n+a))th page to the middle pages (the (N+A)/2)th page and the ((N+A)/2+1)th page) (Step S363).

FIG. 17 is a flowchart showing the detail of the second side stitching RIP process (Step S227 in FIG. 12). In case that (n+a) is not less than 2 (n+a≥2) (Step S381; Yes), the data of the page including the data to be rasterized is rasterized in the order from the (n+a+1)th page to the (N+A)th page (Step S382).

In case that (n+a) is less than 2 (Step S381; No), it is judged whether the RIP for the data of the third page to the (N+A)th page is finished (Step S383). In case that the RIP for the data of the third page to the (N+A)th page is not finished (Step S383; No), the data of the page including the data to be rasterized is sequentially rasterized in the order from the third page (Step S384). In case that the RIP for the data of the third page to the (N+A)th page including the data to be rasterized is finished (Step S383; Yes), the data of the first page and the second page including the data to be rasterized, which has not been rasterized is sequentially rasterized (Step S385).

FIG. 18 is a flowchart showing the detail of the second ring binding RIP process (Step S230 in FIG. 12). In case that the RIP for the data of the (N+A−1)th page and the (N+A)th page including the data to be rasterized is not finished (Step S401; No), the data of the page including the data to be rasterized is sequentially rasterized in the order from the (N+A−1)th page and the (N+A)th page including the data to be rasterized (Step S402). When the RIP for the data of the (N+A−1)th page and the (N+A)th page including the data to be rasterized is finished (Step S401; Yes), the data is sequentially rasterized in the order from the (n+a+1)th page to the (N+A−2)th page (Step S403).

As described above, because the RIP process is carried out in parallel with the reception of the data and the RIP order is optimized by dynamically changing the RIP order according to the progress status of the rasterizing process at the time of the finish of the reception of the reception finish waiting page and the binding format, it is possible to shorten the standby time which elapses until the start of the printing of the image and the time required until the finish of the printing.

As described above, embodiments are explained by using the drawings. However, in the present invention, the concrete configuration is not limited to the above embodiments. In the present invention, various modifications of one or more embodiments or the addition of various functions or the like to the embodiments can be carried out without departing from the gist of the invention.

In one or more embodiments, as the binding format, the saddle stitching, the side stitching, the perfect binding and the ring binding are shown. However, the technology disclosed can be applied to another binding format. In this case, the optimal RIP order is set according to each binding format.

In one or more embodiments, the case in which the blank sheets are inserted is explained. However, even in the case in which the sheets on which the images have been printed are inserted, the process which is the same as that of the case in which the blank sheets are inserted can be carried out.

One or more embodiments of the present invention provide a print control device, a print system, a print control method and a non-transitory computer-readable recording medium which can shorten the standby time which elapses until the start of the printing of the image and can shorten the time required until the finish of the printing, by dynamically controlling the page order for rasterizing the data while a print job which is transmitted in the order from the front page is received.

In one or more embodiments, until the finish of the reception of the data of the predetermined page determined according to the binding format and including the data of which the print control device is encouraged to wait for the finish of the reception (for example, the final page), the data of the page, which has been received is sequentially rasterized in the order from the front page. After the reception of the data of the above predetermined page is finished, the data which has not been rasterized is rasterized in the page order in which the data of the pages, which has not been rasterized is optimally rasterized according to the designated binding format. The page order in which the data is optimally rasterized according to the designated binding format is the page order in which the image forming apparatus prints the images on the recording sheets when the print document is prepared in the designated binding format. In the identical recording sheet, the page order is the order from the page to be printed on the front surface (the surface on which the image is printed initially) to the page to be printed on the rear surface (the surface on which the image is printed subsequently). In each of the front surface and the rear surface, the page order is the order of the reception of the data.

In one or more embodiments, in case that the blank page (the page which does not include the data to be rasterized) is inserted, the page order in which the data is optimally rasterized is the page order including the inserted blank page.

In one or more embodiments, there are many cases in which the final page is included as the pages to be printed on the first recording sheet. Further, after the reception of the data of the final page is finished, the data of an optional page can be rasterized. Therefore, the predetermined page including the data of which the print control device is encouraged to wait for the finish of the reception is set to the final page.

In case that the binding format is the side stitching or the perfect binding of the case binding, the pages to be printed on the first recording sheet are the third page, the fourth page, the fifth page and the sixth page. Therefore, the third page which is received the first among the above pages is set as the predetermined page including the data of which the print control device is encouraged to wait for the finish of the reception.

In one or more embodiments, after the reception of the data of the top page of the pages consecutively precede the last page among the pages to be printed on the first recording sheet is finished, the rasterizing process for the data of the above top page is started. Because the reception of the data of the next page is finished during the rasterizing process for the data of the above top page, it is possible to finish rasterizing the data of all of the pages to be printed on the first recording sheet sooner and to start the printing.

In one or more embodiments, in case that the binding format is the saddle stitching, the page order in which the data is optimally rasterized according to the binding format is the page order from the front page and the final page to the middle pages page by page alternately, such as 1, 2, N−1, 3, N−2, . . . , N/2 and N/2+1, where N is the total number of the pages. Therefore, in case that the rasterizing process for the data of the front page to the nth page is finished at the timing of the finish of the reception of the data of the predetermined page including the data of which the print control device is encouraged to wait for the finish of the reception, firstly, the data of n pages from the final page toward the front page is rasterized in order. Then, the data of the pages is sequentially rasterized in the order from the (n+1)th page and the (N−n)th page to the middle pages (the (N/2)th page and the (N/2+1)th page). The above page order for rasterizing the data corresponds to the order in which the data of the pages, which has not been rasterized is optimally rasterized according to the designated binding format after the finish of the reception of the data of the predetermined page including the data of which the print control device is encouraged to wait for the finish of the reception.

In one or more embodiments, in case that the binding format is the side stitching or the perfect binding of the case binding, the page order in which the data is optimally rasterized according to the binding format is 3, 4, 5, 6, . . . , N−1, N, 1 and 2, where N is the total number of the pages. Therefore, in case that the rasterizing process for the data of the front page and the second page is finished at the timing of the finish of the reception of the data of the predetermined page including the data of which the print control device is encouraged to wait for the finish of the reception, the data of the remaining pages is rasterized to the final page in the order of the reception of the data. In case that the rasterizing process for the data of the front page and the second page is not finished, the data are sequentially rasterized in the order from the third page to the final page. Then, the data of the remaining pages is rasterized in the order of the reception of the data. The above page order for rasterizing the data corresponds to the order in which the data of the pages, which has not been rasterized is optimally rasterized according to the designated binding format after the finish of the reception of the data of the predetermined page.

In one or more embodiments, in case that the binding format is the ring binding, the page order in which the data is optimally rasterized according to the binding format is N−1, N, 1, 2, 3, . . . , N−3 and N−2, where N is the total number of the pages. Therefore, after the finish of the reception of the data of the predetermined page including the data of which the print control device is encouraged to wait for the finish of the reception, firstly, the data of the final page and the previous page thereof is rasterized. Then, the data of the remaining pages is rasterized in the order of the reception of the data. The above page order for rasterizing the data corresponds to the order in which the data of the pages, which has not been rasterized is optimally rasterized according to the designated binding format after the finish of the reception of the data of the predetermined page.

In one or more embodiments, the images are printed in parallel with the reception of the data and the rasterizing process, and the recording sheets are bound.

According to the print control device, the print system, the print control method and the non-transitory computer-readable recording medium, it is possible to shorten the standby time which elapses until the start of the printing of the image and can shorten the time required until the finish of the printing, by dynamically controlling the page order for rasterizing the data while a print job which is transmitted in the order from the front page is received.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A print control device, comprising:
a receiver that receives a print job; and
a processor that generates image data by rasterizing data of each page of the print job in parallel with a reception of the print job and controls a page order for rasterizing the data of each page of the print job,
wherein the processor rasterizes the data of each page of the print job in an order from a front page until a finish of a reception of data of a predetermined page determined according to a binding format of an output document to be prepared by the print job,
the predetermined page includes the data where the print control device is encouraged to wait for the finish of the reception, and
after the reception of the data of the predetermined page is finished, the processor controls the pace order to optimally rasterize the data of each page that has not been rasterized according to the binding format, wherein when the predetermined page is a last page among pages that include the data to be rasterized, and when a total number of pages of the print job is N and a number of pages where data has been rasterized up to the finish of the reception of the data of the predetermined page is n and when the binding format is a saddle stitching, after the reception of the data of the predetermined page is finished, the processor controls the page order to rasterize the data of Nth page to (N−n+1)th page in an order from the Nth page to the (N−n+1)th page and then to rasterize the data of each page that has not been rasterized in an order from (n+1)th page and (N−n)th page to middle pages page by page alternately.

2. The print control device of claim 1, wherein when a position where a blank page is inserted is designated in the print job, the processor controls the page order to include the blank page.

3. The print control device of claim 1, wherein when the predetermined page is a top page of pages that consecutively precede a last page among pages to be printed on a first recording sheet, and when the total number of pages of the print job is N and the number of pages where data has been rasterized up to the finish of the reception of the data of the predetermined page is n and when the binding format is the saddle stitching, and after the reception of the data of the predetermined page is finished, the processor controls the page order to rasterize the data of Nth page to (N−n+1)th page in an order from the Nth page to the (N−n+1)th page and then to rasterize the data of each page that has not been rasterized in an order from (n+1)th page and (N−n)th page to middle pages page by page alternately.

4. The print control device of claim 1, wherein when the predetermined page is the last page among pages that include the data to be rasterized, and when the binding format is a side stitching or a perfect binding of a case binding, after the reception of the data of the predetermined page is finished, and when a rasterizing process for the data of the front page and a second page is finished, then the processor controls the page order to rasterize the data of remaining pages that have not been rasterized, in an order of a reception of data, or when the rasterizing process for the data of the front page and the second page is not finished, then the processor controls the page order to rasterize the data of a third page to the final page in an order from the third page to the final page and then to rasterize the data of remaining pages that have not been rasterized in the order of the reception of the data.

5. The print control device of claim 1, wherein when the predetermined page is a third page when the binding format is a side stitching or a perfect binding of a case binding, and when the binding format is the side stitching or the perfect binding of the case binding, after the reception of the data of the predetermined page is finished, and when a rasterizing process for the data of the front page and a second page is finished, then the processor controls the page order to rasterize the data of remaining pages that have not been rasterized in an order of a reception of data, or when the rasterizing process for the data of the front page and the second page is not finished, then the processor controls the page order to rasterize the data of the third page to the final page in an order from the third page to the final page and then to rasterize the data of remaining pages that have not been rasterized in the order of the reception of the data.

6. The print control device of claim 1, wherein when the predetermined page is the last page among pages that include the data to be rasterized, and when the binding format is a ring binding, and after the reception of the data of the predetermined page is finished, the processor controls the page order to rasterize the data of the final page and a previous page of the final page and then to rasterize the data of remaining pages that have not been rasterized in an order of a reception of data.

7. The print control device of claim 1, wherein when the predetermined page is the last page among pages that include the data to be rasterized, and when the binding format is a ring binding, and after the reception of the data of the predetermined page is finished, the processor controls the page order to rasterize the data of the final page and a previous page of the final page and then to rasterize the data of remaining pages that have not been rasterized in an order of a reception of data.

8. A print system, comprising:
the print control device of claim 1;
an image forming apparatus that prints an image in accordance with the print job, wherein when the image forming apparatus receives image data of all pages to be printed on a next recording sheet in the binding format, the image forming apparatus starts images on the next recording sheet; and
a post-processing device that binds the recording sheets on which the images are printed and the recording sheets are output from the image forming apparatus according to the binding format.

9. A print control method for controlling a page order for rasterizing data of each page of a print job in parallel with a reception of the print job, the method comprising:
rasterizing the data of each page that has been received in an order from a front page until a finish of a reception of data of a predetermined page determined according to a binding format of an output document to be prepared by the print job, wherein the predetermined page includes the data of which a print control device is encouraged to wait for the finish of the reception; and
rasterizing the data of each page that has not been rasterized in a page order for optimally rasterizing the data according to the binding format, after the reception of the data of the predetermined page is finished
wherein when the predetermined page is a last page among pages that include the data to be rasterized, and when a total number of pages of the print job is N and a number of pages where data has been rasterized up to the finish of the reception of the data of the predetermined page is n and when the binding format is a saddle stitching, and after the reception of the data of the predetermined page is finished, the data of Nth page to (N−n+1)th page is rasterized in an order from the Nth page to the (N−n+1)th page, and then the data of each page that has not been rasterized is rasterized in an order from (n+1)th page and (N−n)th page to middle pages page by page alternately.

10. The print control method of claim 9, further comprising converting the page order, when a position in which a blank page is inserted is designated in the print job, into a page order that includes the blank page inserted in the designated position.

11. The print control method of claim 9, wherein when the predetermined page is a third page when the binding format is a side stitching or a perfect binding of a case binding, and when the binding format is the side stitching or the perfect binding of the case binding, after the reception of the data of the predetermined page is finished, and when a rasterizing process for the data of the front page and a second page is finished, then the data of remaining pages that have not been rasterized is rasterized in an order of a reception of data, or when the rasterizing process for the data of the front page and the second page is not finished, then the data of the third page to the final page is rasterized in an order from the third page to the final page and then the data of remaining pages that have not been rasterized is rasterized in the order of the reception of the data.

12. The print control method of claim 9, wherein when the predetermined page is a top page of pages that consecutively precede a last page among pages to be printed on the first recording sheet, and when the total number of pages of the print job is N and the number of pages in which data has been rasterized up to the finish of the reception of the data of the predetermined page is n and when the binding format is the saddle stitching, and after the reception of the data of the predetermined page is finished, the data of Nth page to (N−n+1)th page is rasterized in an order from the Nth page to the (N−n+1)th page, and then the data of each page that has not been rasterized is rasterized in an order from (n+1)th page and (N−n)th page to middle pages page by page alternately.

13. The print control method of claim 9, wherein when the predetermined page is the last page among pages that include the data to be rasterized, and when the binding format is a side stitching or a perfect binding of a case binding, after the reception of the data of the predetermined page is finished, and when a rasterizing process for the data of the front page and a second page is finished, then the data of remaining pages that have not been rasterized is rasterized in an order of a reception of data, or when the rasterizing process for the data of the front page and the second page is not finished, then the data of a third page to the final page is rasterized in an order from the third page to the final page and then the data of remaining pages that have not been rasterized is rasterized in the order of the reception of the data.

14. The print control method of claim 9, wherein when the predetermined page is the last page among pages that include the data to be rasterized, and when the binding format is a ring binding, after the reception of the data of the predetermined page is finished, the data of the final page and a previous page of the final page is rasterized and then the data of remaining pages that have not been rasterized is rasterized in an order of a reception of data.

15. The print control method of claim 9, wherein when the predetermined page is a top page of pages that consecutively precede a last page among pages to be printed on the first recording sheet, and when the binding format is a ring binding, after the reception of the data of the predetermined page is finished, the data of the final page and a previous page of the final page is rasterized and then the data of remaining pages that have not been rasterized is rasterized in an order of a reception of data.

16. A non-transitory computer-readable recording medium storing a program that causes a computer to execute the print control method of claim 9.

\* \* \* \* \*